(12) United States Patent
Sekowski et al.

(10) Patent No.: US 12,465,200 B2
(45) Date of Patent: Nov. 11, 2025

(54) STEERABLE MICRO-ENDOSCOPE HAVING AN ELECTRO-SURGERY TOOL

(71) Applicant: Research Development International Corporation, Pasadena, CA (US)

(72) Inventors: Marek Sekowski, Pacific Palisades, CA (US); Mark Simon, Westlake Village, CA (US); Russ Meek, Sierra Madre, CA (US)

(73) Assignee: Research Development International Corporation, Pasadena, CA (US)

( * ) Notice: Subject to any disclaimer, the term of this patent is extended or adjusted under 35 U.S.C. 154(b) by 160 days.

(21) Appl. No.: 18/132,310

(22) Filed: Apr. 7, 2023

(65) Prior Publication Data

US 2023/0240520 A1    Aug. 3, 2023

Related U.S. Application Data

(60) Division of application No. 15/751,150, filed as application No. PCT/US2015/056279 on Oct. 19, (Continued)

(51) Int. Cl.
*A61B 1/005* (2006.01)
*A61B 1/05* (2006.01)
(Continued)

(52) U.S. Cl.
CPC .......... *A61B 1/0052* (2013.01); *A61B 1/0055* (2013.01); *A61B 1/0057* (2013.01); (Continued)

(58) Field of Classification Search
None
See application file for complete search history.

(56) References Cited

U.S. PATENT DOCUMENTS 3,942,530 A * 3/1976 Northeved ........... A61B 8/4281
                                                       600/105
4,398,910 A    8/1983 Blake
(Continued)

FOREIGN PATENT DOCUMENTS

CN      1861010 A    11/2006
CN    102438532 A     5/2012
(Continued)

OTHER PUBLICATIONS

From U.S. Appl. No. 15/751,150 (now published as US 2018-0228345 A1), Office Action mailed on Apr. 7, 2023.
(Continued)

*Primary Examiner* — Anh Tuan T Nguyen
*Assistant Examiner* — Jae Woo
(74) *Attorney, Agent, or Firm* — Ladas & Parry, LLP

(57) ABSTRACT

A steerable micro-endoscope comprising a cylindrical elongated member having at least a first lumen, a tensioning wire running in the first lumen and attached at the distal end of the elongated member;
the elongated member having a proximal portion and a distal portion, having respectively a first durometer and a second durometer lower than the first durometer; the first lumen being arranged such that the distal portion of the elongated body bends when the tensioning wire is pulled;
wherein the elongated member comprises a second lumen; an electrode wire being arranged in the second lumen such that the distal end of the electrode wire does not protrude from the distal portion of the elongated member when the elongated member is not bent, and such that the distal end of the electrode wire protrudes from the distal portion of the elongated member when the elongated member is bent.

28 Claims, 14 Drawing Sheets

Related U.S. Application Data 2015, now abandoned, which is a continuation-in-part of application No. PCT/US2015/027170, filed on Apr. 22, 2015.

(60) Provisional application No. 62/066,340, filed on Oct. 20, 2014.

(51) Int. Cl.
*A61B 1/07* (2006.01)
*G02B 23/24* (2006.01)
*A61B 1/00* (2006.01)
*A61B 1/018* (2006.01)
*A61B 17/00* (2006.01)
*A61B 18/14* (2006.01)

(52) U.S. Cl.
CPC .............. *A61B 1/05* (2013.01); *A61B 1/07* (2013.01); *G02B 23/2476* (2013.01); *A61B 1/00087* (2013.01); *A61B 1/018* (2013.01); *A61B 2017/00318* (2013.01); *A61B 18/1492* (2013.01)

(56) References Cited

U.S. PATENT DOCUMENTS

| | | |
|---|---|---|
| 4,402,685 A | 9/1983 | Buhler |
| 4,451,256 A | 5/1984 | Weikl |
| 4,498,902 A | 2/1985 | Ash |
| 4,566,400 A | 1/1986 | Keenan |
| 4,569,347 A | 2/1986 | Frisbie |
| 4,580,551 A | 4/1986 | Siegmund |
| 4,718,407 A | 1/1988 | Chikama |
| 4,781,690 A | 11/1988 | Ishida |
| 4,788,967 A | 12/1988 | Ueda |
| 4,798,193 A | 1/1989 | Giesy |
| 4,869,238 A * | 9/1989 | Opie ................. A61B 1/00071 600/920 |
| 4,888,000 A | 12/1989 | Mc Quilkin |
| 4,997,424 A | 3/1991 | Little |
| 5,147,332 A | 9/1992 | Moorehead |
| 5,195,978 A | 3/1993 | Schiffer |
| 5,197,457 A | 3/1993 | Adair |
| 5,213,093 A | 5/1993 | Swindle |
| 5,299,562 A | 4/1994 | Heckele |
| 5,324,269 A | 6/1994 | Miraki |
| 5,325,845 A | 7/1994 | Adair |
| 5,342,299 A | 8/1994 | Snoke |
| 5,383,852 A | 1/1995 | Stevens |
| 5,397,311 A | 3/1995 | Walker |
| 5,405,334 A | 4/1995 | Roth |
| 5,507,725 A | 4/1996 | Savage |
| 5,533,986 A | 7/1996 | Mottola |
| 5,571,085 A | 11/1996 | Accisano |
| 5,674,182 A | 10/1997 | Suzuki |
| 5,704,899 A | 1/1998 | Milo |
| 5,817,072 A | 10/1998 | Lampropoulos |
| 5,836,306 A | 11/1998 | Duane |
| 5,861,002 A * | 1/1999 | Desai ................. A61M 1/774 606/139 |
| 6,030,360 A | 2/2000 | Biggs |
| 6,083,152 A | 7/2000 | Strong |
| 6,159,198 A | 12/2000 | Gardeski |
| 6,171,235 B1 | 1/2001 | Konstorum |
| 6,193,691 B1 | 2/2001 | Beardsley |
| 6,497,681 B2 | 12/2002 | Brenner |
| 6,740,030 B2 | 5/2004 | Martone |
| 6,887,417 B1 | 5/2005 | Gawreluk |
| 7,033,317 B2 | 4/2006 | Pruitt |
| 7,048,719 B1 | 5/2006 | Monetti |
| 7,658,738 B2 | 2/2010 | Nobis |
| 8,029,473 B2 | 10/2011 | Carter |
| 8,262,563 B2 | 9/2012 | Bakos |
| 8,320,650 B2 | 11/2012 | Demos |
| 8,517,921 B2 | 8/2013 | Tremaglio |
| 8,932,208 B2 | 1/2015 | Kendale |
| 9,468,362 B2 | 10/2016 | Goldfarb |
| 10,368,910 B2 | 8/2019 | Eversull |
| 10,874,831 B2 * | 12/2020 | Rosenman ........ A61M 25/0045 |
| 11,103,127 B2 | 8/2021 | Sekowski |
| 11,540,703 B2 | 1/2023 | Sekowski |
| 2002/0068912 A1 | 6/2002 | Merdan |
| 2002/0072712 A1 | 6/2002 | Nool |
| 2003/0032941 A1 | 2/2003 | Boyle |
| 2003/0040666 A1 * | 2/2003 | Rutten ................. A61B 1/0057 600/374 |
| 2003/0093085 A1 | 5/2003 | Leopold |
| 2003/0130564 A1 | 7/2003 | Martone |
| 2003/0130620 A1 | 7/2003 | Alokaili |
| 2003/0171650 A1 | 9/2003 | Tartaglia |
| 2003/0187427 A1 | 10/2003 | Gatto |
| 2003/0212373 A1 | 11/2003 | Hall |
| 2003/0233024 A1 | 12/2003 | Ando |
| 2003/0233115 A1 | 12/2003 | Eversull |
| 2004/0059271 A1 | 3/2004 | Maguire |
| 2004/0064147 A1 | 4/2004 | Struble |
| 2004/0106852 A1 | 6/2004 | Mindheuser |
| 2005/0059890 A1 | 3/2005 | Deal |
| 2005/0085841 A1 | 4/2005 | Eversull |
| 2005/0107738 A1 | 5/2005 | Slater |
| 2005/0124918 A1 | 6/2005 | Griffin |
| 2005/0131279 A1 | 6/2005 | Boulais |
| 2005/0149097 A1 | 7/2005 | Regnell |
| 2005/0154262 A1 | 7/2005 | Banik |
| 2005/0182387 A1 | 8/2005 | Webler |
| 2005/0222558 A1 | 10/2005 | Baxter |
| 2005/0256508 A1 | 11/2005 | Hall |
| 2005/0261554 A1 | 11/2005 | Scholly |
| 2005/0261674 A1 | 11/2005 | Nobis |
| 2006/0030753 A1 | 2/2006 | Boutillette |
| 2006/0030864 A1 | 2/2006 | Kennedy |
| 2006/0149127 A1 | 7/2006 | Seddiqui |
| 2006/0253183 A1 * | 11/2006 | Thagalingam ........ A61N 1/0502 607/126 |
| 2007/0043324 A1 | 2/2007 | Shibata |
| 2007/0043338 A1 | 2/2007 | Moll |
| 2007/0078455 A1 * | 4/2007 | Rashidi ............. A61B 18/1492 606/41 |
| 2007/0215268 A1 | 9/2007 | Pingleton |
| 2007/0225559 A1 | 9/2007 | Clerc |
| 2007/0249907 A1 | 10/2007 | Boulais |
| 2007/0293726 A1 | 12/2007 | Goldfarb |
| 2008/0009857 A1 * | 1/2008 | Yanuma ............. A61B 1/00177 606/46 |
| 2008/0015625 A1 | 1/2008 | Ventura |
| 2008/0045787 A1 | 2/2008 | Snay |
| 2008/0132762 A1 | 6/2008 | Melville |
| 2008/0154207 A1 | 6/2008 | Hardin |
| 2008/0177142 A1 * | 7/2008 | Roskopf ............. A61B 1/00154 600/115 |
| 2008/0183035 A1 | 7/2008 | Vakharia |
| 2008/0208133 A1 | 8/2008 | Lieberman |
| 2008/0245371 A1 | 10/2008 | Gruber |
| 2008/0262300 A1 | 10/2008 | Ewers |
| 2008/0319418 A1 | 12/2008 | Chong |
| 2009/0049698 A1 | 2/2009 | Drake |
| 2009/0171161 A1 | 7/2009 | Ewers |
| 2009/0281376 A1 | 11/2009 | Acosta |
| 2010/0032470 A1 | 2/2010 | Hess |
| 2010/0099952 A1 * | 4/2010 | Adams ............. A61M 25/0147 604/95.04 |
| 2010/0121269 A1 | 5/2010 | Goldenberg |
| 2010/0130850 A1 | 5/2010 | Pakter |
| 2010/0145331 A1 | 6/2010 | Chrisitian |
| 2010/0268123 A1 | 10/2010 | Callahan |
| 2011/0245765 A1 | 10/2011 | Jacobsen |
| 2011/0245827 A1 * | 10/2011 | Okada ................... A61B 17/29 606/1 |
| 2012/0018082 A1 | 1/2012 | Kuboi |
| 2012/0029421 A1 | 2/2012 | Drake |
| 2012/0172663 A1 | 7/2012 | Perretta |
| 2012/0184954 A1 | 7/2012 | Onishi |
| 2012/0215071 A1 | 8/2012 | Mahlin |

(56) References Cited

U.S. PATENT DOCUMENTS

| | | | |
|---|---|---|---|
| 2012/0296167 A1 | 11/2012 | Chen | |
| 2013/0028554 A1 | 1/2013 | Wong | |
| 2013/0046144 A1 | 2/2013 | Iede | |
| 2013/0109919 A1 | 5/2013 | Sugiyama | |
| 2013/0172673 A1 | 7/2013 | Kennedy | |
| 2013/0197310 A1* | 8/2013 | Hino | A61B 1/018 600/153 |
| 2013/0253481 A1 | 9/2013 | Dewaele | |
| 2013/0289352 A1 | 10/2013 | Boulais | |
| 2014/0024951 A1 | 1/2014 | Herzlinger | |
| 2014/0066706 A1 | 3/2014 | McWeeney | |
| 2014/0073854 A1 | 3/2014 | Vincent | |
| 2014/0135576 A1 | 5/2014 | Hebert | |
| 2014/0148759 A1 | 5/2014 | Mcnamara | |
| 2014/0243592 A1 | 8/2014 | Kato | |
| 2014/0276966 A1 | 9/2014 | Ranucci | |
| 2014/0336456 A1* | 11/2014 | Demers | A61B 1/00133 600/137 |
| 2015/0231388 A1 | 8/2015 | Barker | |
| 2016/0096004 A1 | 4/2016 | Gerrans | |
| 2016/0310701 A1 | 10/2016 | Pai | |
| 2017/0224956 A1 | 8/2017 | Melsheimer | |
| 2017/0340193 A1 | 11/2017 | Gambhir | |
| 2018/0228345 A1 | 8/2018 | Sekowski | |
| 2018/0344987 A1 | 12/2018 | Lancette | |
| 2019/0082940 A1 | 3/2019 | Igov | |
| 2019/0117937 A1 | 4/2019 | Humphrey | |
| 2019/0224458 A1 | 7/2019 | Morera | |
| 2019/0224459 A1 | 7/2019 | Pedroni | |
| 2019/0380562 A1* | 12/2019 | Deuel | A61B 1/00131 |
| 2020/0054353 A1* | 2/2020 | Yun | A61B 18/1485 |

FOREIGN PATENT DOCUMENTS

| | | |
|---|---|---|
| CN | 103654694 A | 3/2014 |
| CN | 107529958 A | 10/2014 |
| CN | 104219987 A | 12/2014 |
| JP | 2013-106713 A | 6/2013 |
| WO | 02/053221 | 7/2002 |
| WO | 2004/086957 | 10/2004 |
| WO | 2012/088167 | 6/2012 |
| WO | 2016/064449 | 4/2016 |
| WO | 2016/064763 | 4/2016 |
| WO | 2016/171780 | 10/2016 |

OTHER PUBLICATIONS

From U.S. Appl. No. 15/751,150 (now published as US 2018-0228345 A1), Office Action mailed on Jan. 24, 2022.
From U.S. Appl. No. 15/751,150 (now published as US 2018-0228345 A1), Office Action mailed on Jul. 19, 2021.
From U.S. Appl. No. 15/751,150 (now published as US 2018-0228345 A1), Office Action mailed on Oct. 2, 2020.
From U.S. Appl. No. 15/751,150 (now published as US 2018-0228345 A1), Office Action mailed on Apr. 13, 2020.
PCT International Search Report from PCT/US2015/056279 mailed on Jan. 13, 2016.
From U.S. Appl. No. 15/751,153 (now published as U.S. Pat. No. 11,103,127), Office Action dated Dec. 21, 2020.
From U.S. Appl. No. 15/751,153 (now published as U.S. Pat. No. 11,103,127), Office Action dated Apr. 13, 2020.
PCT Written Opinion of the International Search Authority from PCT/US2015/056279 mailed on Jan. 13, 2016.
PCT International Preliminary Report on Patentability from PCT/US2015/056279 issued on Apr. 25, 2017.
PCT International Search Report from PCT/US2015/027170 mailed on Jul. 27, 2015.
PCT International Written Opinion from PCT/US2015/027170 mailed on Jul. 27, 2015.
PCT International Preliminary Report on Patentability (Chapter I) with Written Opinion from PCT/US2015/027170 issued on Apr. 25, 2017.
PCT International Search Report from PCT/US2016/017033 mailed on May 10, 2016.
PCT International Written Opinion from PCT/US2016/017033 mailed on May 10, 2016.
PCT International Preliminary Report on Patentability (Chapter I) with Written Opinion from PCT/US2016/017033 issued on Oct. 24, 2017.
EPO partial supplementary search report from European Patent Application No. 15852048.6 dated Mar. 7, 2018.
EPO extended Search Report from European Patent Application No. 15852048.6 dated Jun. 8, 2018.
EPO extended search report from European Patent Application No. 15852255.7 dated Dec. 19, 2018.
EPO extended search report from European Patent Application No. 16783528.9 dated Jan. 7, 2019.
EPO extended search report from European Patent Application No. 20020249.7 dated Oct. 9, 2020.
Office action from Chinese Patent Application No. 201580068398.5 dated Aug. 4, 2021, and its machine English translation.
Office action from Chinese Patent Application No. 201580068398.5 dated Feb. 1, 2021, and its machine English translation.
Office action from Chinese Patent Application No. 201580068398.5 dated Apr. 27, 2020.
Office action from Chinese Patent Application No. 201580068398.5 dated Aug. 2, 2019 with search report and its English translation.
Office action from Chinese Patent Application No. 201580068398.5 dated Sep. 29, 2018 and its English translation.
Office action from Chinese Patent Application No. 201580068469.1 dated Jan. 6, 2021, and its English translation.
Office action from Chinese Patent Application No. 201580068469.1 dated Apr. 14, 2020, and its English translation.
Office action from Chinese Patent Application No. 201580068469.1 dated Jul. 29, 2019 and its English translation.
Office action from Chinese Patent Application No. 201580068469.1 dated Sep. 29, 2018 with search report and its English translation.
Office action from Chinese Patent Application No. 201680028488.6 dated May 29, 2020, and its English translation.
Office action from Chinese Patent Application No. 201680028488.6 dated Oct. 9, 2019 and its English translation.
Office action from Chinese Patent Application No. 201680028488.6 dated Mar. 21, 2019 and its English translation.

* cited by examiner

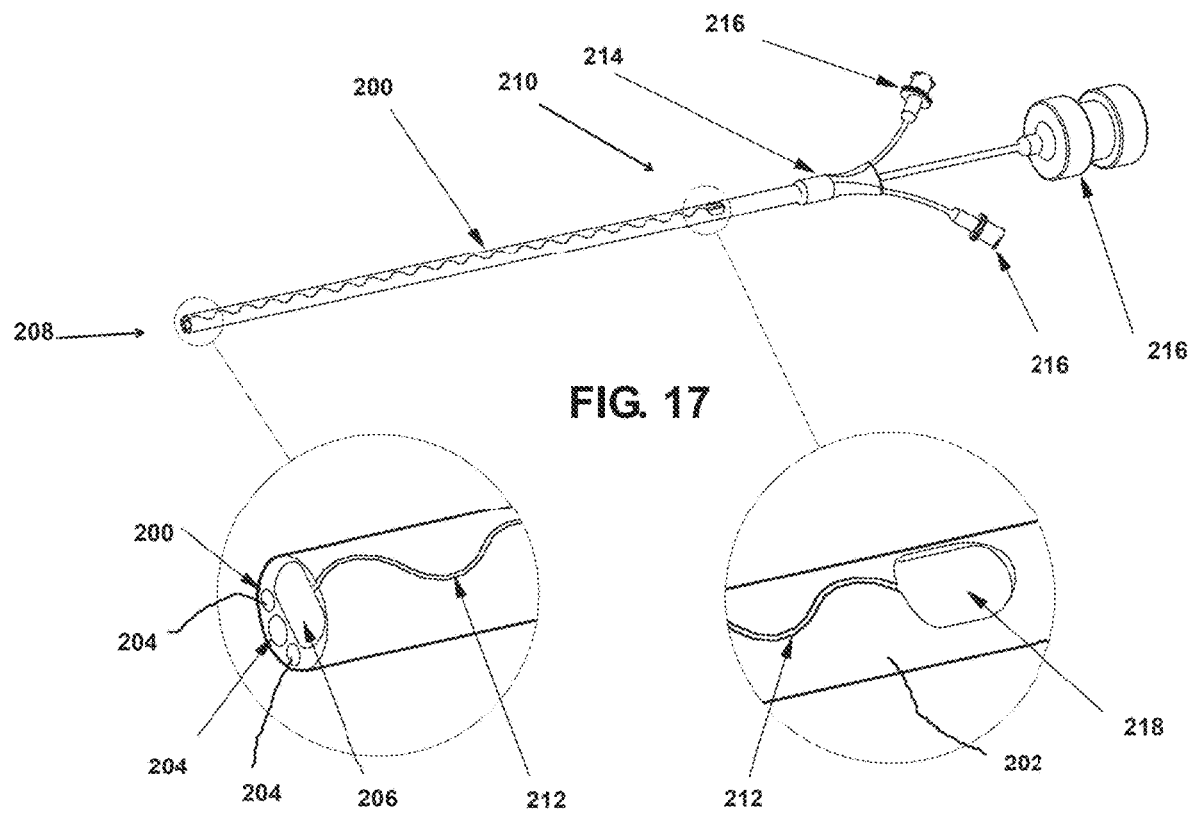
FIG. 17
FIG. 18A
FIG. 18B
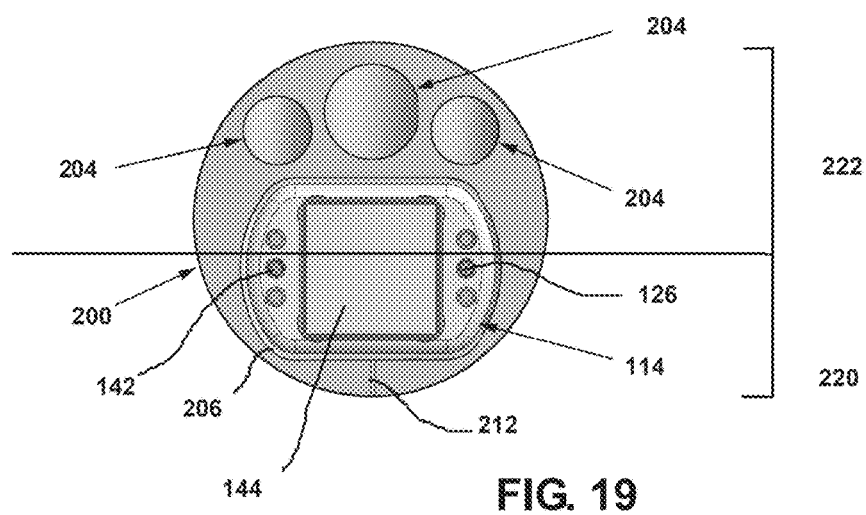
FIG. 19

STEERABLE MICRO-ENDOSCOPE HAVING AN ELECTRO-SURGERY TOOL

RELATED APPLICATIONS

This application is a divisional of U.S. application Ser. No. 15/751,150, filed on Feb. 7, 2018 which is related to and claims priority and the benefit of U.S. Patent Application Ser. No. 62/066,340, filed on Oct. 20, 2014, PCT Application No. PCT/US2015/027170, filed on Apr. 22, 2015, and PCT Application No. PCT/US2015/056279, filed on Oct. 19, 2015, which are each incorporated by reference herein in their entirety.

FIELD OF THE PRESENTATION

This presentation relates to steerable endoscopes for inserting into body vessels or cavities and performing surgery there, and methods of making thereof.

This presentation also relates to catheters capable of being coupled to an in-situ elongated guiding device, such as a steerable endoscope as disclosed in this presentation.

BACKGROUND OF THE PRESENTATION

Various commercially available catheters and endoscopes exist for introducing into the body vessels and cavities a variety of surgical tools, fluids, and other materials, such as radiographic contrast materials, angioplasty balloons, fiberoptic scopes, laser lights, and cutting instruments. Also, various techniques and systems have been developed for guiding or steering the catheters in the body vessels and cavities for use of these tools, fluids, and other materials.

Examples of such guiding or steering techniques and systems for catheters or endoscopes may be seen in: U.S. Pat. No. 5,342,299 to Snoke entitled "steerable catheter"; in WO2004086957 to Banik, entitled "Single use endoscopic imaging system"; in US20140135576 to Hebert, entitled "Coaxial micro-endoscope"; in U.S. Pat. No. 8,517,921 to Tremaglio, entitled "Endoscopic instrument having reduced diameter flexible shaft"; in U.S. Pat. No. 8,262,563 to Bakos, entitled "Endoscopic translumenal articulatable steerable overtube"; in U.S. Pat. No. 8,320,650 to Demos, entitled "In vivo spectral micro-imaging of tissue"; in US 2008/0319418 to Chong, entitled "Catheter Steering Device"; in WO 02/053221 to Gaber, entitled "Deflectable Guiding Apparatus"; in U.S. Pat. No. 4,580,551 to Siegmund, entitled "Flexible Plastic Tube for Endoscope and the Like"; in U.S. Pat. No. 5,325,845 to Adair, entitled "Steerable Sheath for Use with Selected Removable Optical Catheter"; in U.S. Pat. No. 4,798,193 to Giesy, entitled "Protective Sheath Instrument Carrier"; in U.S. Pat. No. 4,788,967 to Ueda; entitled "Endoscope"; in U.S. Pat. No. 7,033,317 to Pruitt, entitled "disposable endoscope and method of making a disposable endoscope; in U.S. Pat. No. 5,197,457 to Adair, entitled "deformable and removable sheath for optical catheter".

However, there exists a need for a simple to manufacture steerable micro-endoscope with a steerable distal end which allows performing surgery with minimal invasion of the body.

Further, it is known to introduce a catheter in a body using a catheter having a straightening guide wire in the catheter, then sliding the guide wire out of the catheter once the catheter is in a desired position. U.S. Pat. Nos. 4,888,000 and 5,197,457 describe such a structure. It is also known to introduce a catheter using an outer sleeve assembly that is removed from around the catheter once the catheter is in position. U.S. Pat. Nos. 5,397,311 and 6,887,417 describe sleeves that can be split for removal. It is also known to introduce a catheter along a desired path in a body using an over-the-wire catheter, by sliding the catheter on a positioned guiding wire. However, in known over-the-wire catheters, the distal end of the guiding wire must be introduced in the distal end of the guidewire lumen before the catheter is slid along the guiding wire. U.S. Pat. No. 5,324,269 discloses an over-the-wire catheter having a rip seam that allows exchanging a catheter without compromising guidewire access to a target lesion.

However, there exists a need for an over-the-wire catheter that does not require access to the proximal end of a guidewire, endoscope or other guiding means to be slid over the guidewire or other guiding means.

SUMMARY OF THIS PRESENTATION

An object of this presentation relates to a steerable micro-endoscope, having at least a lumen for conducting light to its distal end, having a camera at its distal end as well as an electro-surgery tool.

An object of this presentation relates to a micro-endoscope with an electro-surgery tool that is steerable in that it has an elongated member with a distal portion that bends in a remotely controlled way, wherein the elongated member rotates axially in a controllable way.

An object of this presentation relates to a micro-endoscope having a housing of such a size as to be readily held in the hand of a user.

An object of this presentation relates to a micro-endoscope that has an elongated member with a cross section having a maximum dimension of 2 millimeter or less comprising a camera at its distal end, an electrosurgery tool that has a maximum diameter of 0.15 millimeter, that can be caused to protrude from a lumen arranged at a distance smaller than 0.5 millimeter of the edge of the camera.

These and other objects, features, and advantages are provided in a steerable
  micro-endoscope comprising a cylindrical elongated member having at least a first lumen, a tensioning wire running in the first lumen and attached at the distal end of the elongated member;
  the elongated member having a proximal portion and a distal portion, having respectively a first durometer and a second durometer lower than the first durometer; the first lumen being arranged such that the distal portion of the elongated body bends when the tensioning wire is pulled;
  wherein the elongated member comprises a second lumen; an electrode wire being arranged in the second lumen such that the distal end of the electrode wire does not protrude from the distal portion of the elongated member when the elongated member is not bent, and such that the distal end of the electrode wire protrudes from the distal portion of the elongated member when the elongated member is bent.

According to an embodiment of this presentation, the elongated member is held in a torque mesh-sheath, or torque braid. According to an embodiment of this presentation, the torque braid is made of wires having a non-circular cross-section; for example a flattened circular section wire having a flat thickness ½ the diameter of the circular section wire.

According to an embodiment of this presentation, the braid wire is heated just prior to braiding onto the plastic elongated member such that the braid wire slightly melts into the plastic elongated member to add strength to the rotational torque due to the braiding holding better the longitudinal position while rotating.

According to an embodiment of this presentation, the electrode wire is coated with an insulator. According to an embodiment of this presentation, the insulator is provided for facilitating the sliding of the electrode wire in the second lumen. According to an embodiment of this presentation, the insulator is 20 microns thick or less.

According to an embodiment of this presentation, the first durometer is chosen such that the proximal portion is flexible enough to be inserted in a desired body cavity without damaging the cavity, and the second durometer is chosen such that when the tensioning wire is pulled, the distal portion bends. According to an embodiment of this presentation, the second durometer is chosen such that when the tensioning wire is relaxed after having been pulled, the distal portion tends to return to an unbent shape.

According to an embodiment of this presentation, the torque braid is covered by a flexible outer sheath or jacket.

According to an embodiment of this presentation, the elongated member comprises a third lumen; an optical fiber arranged in the third lumen having a proximal end capable of receiving light from a source of light and a distal end capable of emitting light received at the proximal end from the distal end. According to an embodiment of this presentation, the proximal end of the optical fiber is coupled with a connector for interfacing with a source of light.

According to an embodiment of this presentation, the elongated member comprises a fourth lumen and the distal end of the elongated member comprises a camera, at least a first wire of the camera running through the fourth lumen. According to an embodiment of this presentation, a plurality of shielded wires of the camera run through the fourth lumen. According to an embodiment of this presentation, the proximal ends of the wires of the camera are coupled to a connector for interfacing with an imaging device. According to an embodiment of this presentation, the camera is aligned along the axis of the elongated member.

According to an embodiment of this presentation, the distal end of the distal portion comprises a head made in a material different from the material of the elongated member, a distal portion of the head having the same cross section surface/external dimensions as the elongated member with the torque braid and the outer sheath or jacket. A proximal portion of the head can be provided for being inserted in an appropriate cavity formed at the distal end of the elongated member. According to an embodiment of this presentation, the distal end of the tensioning wire is attached to the head. According to an embodiment of this presentation, the camera is attached in the head. According to an embodiment of this presentation, the head comprises at least one lumen through which passes the distal end of the electrode wire. According to an embodiment of this presentation, the head is made out of an insulator. According to an embodiment of this presentation, the head is made out of metal and the lumen for the electrode wire is lined with an insulator. According to an embodiment of this presentation, the head comprises at least one lumen through which passes the distal end of the optical fiber. According to an embodiment of this presentation, the whole length of the electrode wire is coated with an insulator. According to an embodiment of this presentation, the thickness of insulator coating on the electrode wire is of 20 microns or less.

According to an embodiment of this presentation, the elongated member has a circular cross-section with a diameter lower than 2 millimeter. According to an embodiment of this presentation, the elongated member has a non circular cross-section with a maximum dimension lower than 2 millimeter. According to an embodiment of this presentation, the tensioning wire has a diameter of 0.15 millimeter or less.

According to an embodiment of this presentation, the elongated member comprises two first lumen containing each a tensioning wire, wherein the distal ends of the tensioning wires in the two first lumens were formed as a single wire. According to an embodiment of this presentation, the lumen of the electrode wire is arranged between the two first lumens.

According to an embodiment of this presentation, the tensioning wire is coated with a lubricant and is in direct contact with the inner walls of the first lumen.

According to an embodiment of this presentation, the elongated member and any lumen in the elongated member are formed by extrusion.

According to an embodiment of this presentation, the proximal end of the elongated member is attached to a base that is rotatable with respect to a proximal housing around an axis of the proximal end of the elongated member. According to an embodiment of this presentation, the base is rotatable manually. According to an embodiment of this presentation, the base comprises a lock for releasably locking the base rotated along a desired angle. According to an embodiment of this presentation, the base comprises a knob for controllably rotating the base.

According to an embodiment of this presentation, the housing comprises a lever for controllably pulling on the proximal end of the tensioning wire. According to an embodiment of this presentation, the lever comprises a lock for releasably locking the tensioning wire pulled along a desired length. According to an embodiment of this presentation, the tensioning wire passes through a flexible sheath that is not compressible axially between the base and the lever. According to an embodiment of this presentation, the tensioning wire is coupled to the lever using cogwheels or gears. According to an embodiment of this presentation, the ratio between the cogwheels or gears can be changed to adjust the sensitivity of the lever.

According to an embodiment of this presentation, the housing is shaped for being held in one hand, such that the lever can be actuated by tightening the grip of the hand and the base can be rotated by actuation of a knob with the thumb of the hand, for example at the same time.

According to an embodiment of this presentation, the housing comprises a connector for coupling the electrode wire to an electrosurgery power generator. According to an embodiment of this presentation, the electrosurgery power generator is activable using a pedal. According to an embodiment of this presentation, the housing comprises a processor unit for image processing.

According to an embodiment of this presentation, the elongated member comprises two first lumen containing each one tensioning wire, the two first lumens being arranged on opposed sides of the electrode wire lumen.

According to an embodiment of this presentation, the elongated member has a circular cross section.

According to an embodiment of this presentation, the elongated member has an elliptic cross section.

According to an embodiment of this presentation, the elongated member has a cross section comprising two half circles joined by straight lines.

According to an embodiment of this presentation, the proximal portion and the distal portion of the elongated member are extruded (using micro-extrusion) out of two different materials and are assembled together after extrusion.

Another object of this presentation relates to an over-the-wire catheter that does not require access to the proximal end of a guidewire or other guiding means to be slid over the guidewire or other guiding means.

An embodiment of this presentation relates to a catheter comprising an elongated member of cylindrical shape comprising first and second lumens extending each between a distal end and a proximal portion of the elongated member;
wherein the elongated member comprises a lateral non-straight opening, or "wave" opening, following a periodic or pseudo-periodic wave along the whole length of the second lumen, at least between the distal end of the elongated member and a proximal portion of the elongated member.

According to an embodiment of this presentation, the elongated member has a circular cross section.

According to an embodiment of this presentation, the elongated member has a non-circular cross section.

According to an embodiment of this presentation, the second lumen has a cross section that is larger than the cross section of the first lumen.

According to an embodiment of this presentation, the lateral wave opening along the whole length of the second lumen follows a periodic pattern.

According to an embodiment of this presentation, the lateral wave opening follows a sinusoidal pattern along the whole length of the second lumen, at least between the distal end of the elongated member and a proximal portion of the elongated member.

According to an embodiment of this presentation a first portion of the elongated member, which comprises the elongated member around a part of the second lumen on both sides of the lateral opening, is made of a first material having a first durometer; and a second a portion of the elongated member, which comprises the elongated member around the first lumen and the remainder of the second lumen, is made of a second material having a second durometer lower than the first durometer.

According to an embodiment of this presentation, the first durometer can be of 55 and the second durometer can be of 25.

An embodiment of this presentation comprises a method of manufacturing a catheter according to this presentation by extruding the catheter using the first and second materials at the time of the extrusion.

According to an embodiment of this presentation the first and second materials are a single material; the second durometer being obtained by mechanically treating the material to lower its durometer, for example by forming cuts or holes in the material.

According to an embodiment of this presentation the first and second materials are a single material; the second durometer being obtained by chemically treating the material to lower or increase the durometer where appropriate.

According to an embodiment of this presentation, the lateral opening is such that both sides of the lateral opening are in contact when the second lumen is empty.

According to an embodiment of this presentation, the lateral opening is such that both sides of the lateral opening are distant by a distance smaller than the width of the second lumen when the second lumen is empty.

According to an embodiment of this presentation, the lateral opening ends in the proximal portion of the elongated member with a lateral gap opening as wide as the second lumen.

According to an embodiment of this presentation, the elongated member comprises a plurality of first lumens.

According to an embodiment of this presentation, the first lumen is provided for transferring a fluid from the proximal portion of the elongated member to the distal portion of the elongated member.

According to an embodiment of this presentation, the first lumen is provided for transferring a fluid from the distal portion of the elongated member to the proximal portion of the elongated member.

According to an embodiment of this presentation, the first lumen comprises an optical fiber for transferring light from the proximal portion of the elongated member to the distal portion of the elongated member.

According to an embodiment of this presentation, the first lumen comprises an optical fiber for transferring light from the distal portion of the elongated member to the proximal portion of the elongated member.

According to an embodiment of this presentation, the distal end of the elongated member comprises a camera and the first lumen comprises the camera cable.

According to an embodiment of this presentation, the distal end of the elongated member comprises a surgical tool such as an electrosurgery tool or an ultrasound tool or a biopsy tool and the first lumen comprises at least one wire for controlling the surgical tool.

According to an embodiment of this presentation, the catheter is disposable.

An embodiment of this presentation relates to a coupler (a) for installing around an elongated guiding structure (b) a resilient tube (c) having a lumen with a lateral opening along its length, the coupler (a) comprising:
 a base (d) capable of being attached to a proximal portion of the elongated guiding structure (b);
 a curved branch (e) having a first end capable of being inserted in the lumen of the tube (c) and a second end having a wall tangent to the proximal portion of the elongated guiding structure (b); and
 a wedge (f) arranged between the base (d) and the curved branch (e) for separating the edges of the lateral opening of the tube (c) when the tube is moved in a first direction from the first end to the second end of the curved branch (e), such that the elongated guiding structure (b) is comprised between the separated edges of the lateral opening of the tube (c) when the tube reaches the second end of the curved branch (e);
 the coupler (a) being arranged such that the portion of the resilient tube (c) that moves away from the second end of the curved branch as the tube (c) keeps being pushed along the first direction closes around the elongated guiding structure (b).

According to an embodiment of this presentation, the base (d) of the coupler (a) comprises a lock (g) for attaching the coupler to the proximal portion of the elongated guiding structure (b).

BRIEF DESCRIPTION OF THE DRAWINGS

FIG. 17 is an elevation view of a catheter according to an embodiment of this presentation.

FIGS. 18A and 18B show details of the distal and proximal ends of the lateral opening of the catheter of FIG. 17.

FIG. 19 is a front view of the distal end of the catheter shown in FIG. 18, coupled to a micro endoscope such as shown in FIGS. 9-11.

DETAILED DESCRIPTION

In the following description, numerous specific details are set forth to clearly describe various specific embodiments disclosed herein. One skilled in the art, however, will understand that the presently claimed invention may be practiced without all of the specific details discussed below.

In other instances, well known features have not been described so as not to obscure the invention. The same references designate the same elements in the figures.

Figure 1:
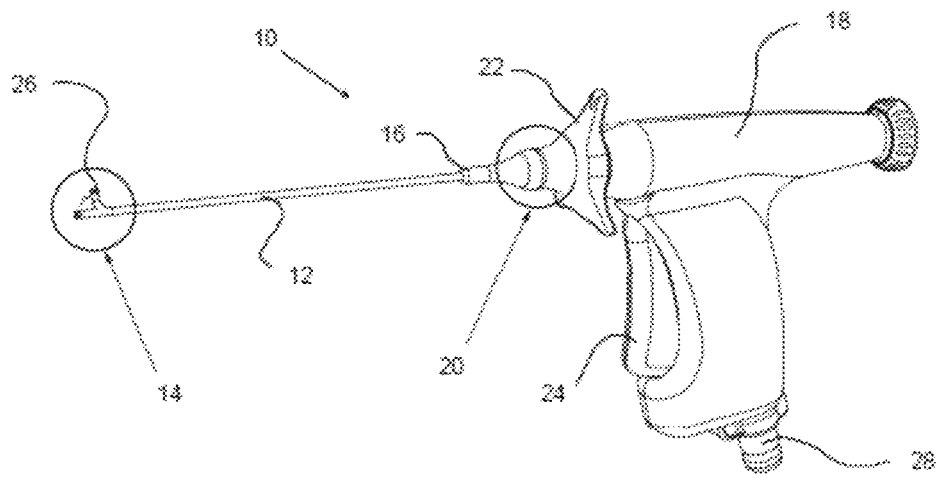
FIG. 1 is an elevation view of a steerable electro-surgery micro-endoscope according to an embodiment of this presentation.

FIG. 1 is an elevation view of a steerable electro-surgery micro-endoscope 10 according to an embodiment of this presentation, having an elongated member 12 with a distal end 14 and a proximal end 16, and having a body 18. According to an embodiment of this presentation, the proximal end 16 of the elongated member 12 is attached to a base 20 that is rotatable with respect to the housing 18 around an axis of the proximal end of the elongated member.

According to an embodiment of this presentation, the base 20 is rotatable manually; a knob 22 allowing to controllably rotate the base. According to an embodiment of this presentation, the base can comprise a lock (not shown) for releasably locking the base 16 rotated along a desired angle.

According to an embodiment of this presentation, housing 18 comprises a lever 24 for controllably pulling on the proximal end of at least one tensioning wire (not shown) in the elongated member 12, so as to controllably bend the distal end 14 of the elongated member 12 (as illustrated in the figure). According to an embodiment of this presentation, lever 24 comprises a lock (not shown) for releasably locking the tensioning wire pulled along a desired length. As detailed hereafter, according to an embodiment of this presentation, the tensioning wire passes through a flexible tensioning sheath (not shown) that is not compressible axially between base 20 and lever 24. As detailed hereafter, according to an embodiment of this presentation, the tensioning wire is coupled to the lever 24 using cogwheels or gears (not shown). According to an embodiment of this presentation, the ratio between the cogwheels or gears can be changed to adjust the sensitivity of the lever.

According to an embodiment of this presentation, housing 18 is shaped for being held in one hand, such that lever 24 can be actuated by tightening the grip of the hand and base 20 can be rotated by actuation of knob 22 with the thumb of the hand, for example at the same time.

As detailed hereafter, according to an embodiment of this presentation, an electrode wire 26 runs in an electrode lumen (not shown) of elongated member 12 from distal end 14 to inside the housing 18, through proximal end 16 and base 20. As detailed hereafter, electrode wire 26 is arranged such that a distal end of the electrode wire 26 does substantially not protrude from distal end 14 when the elongated member 12 is not bent, and such that the distal end of the electrode wire 26 protrudes from distal end 14 when the elongated member 12 is bent by more than a predetermined angle.

As detailed hereafter, according to an embodiment of this presentation, the housing 18 comprises a connector 28 for coupling a proximal end of electrode wire 26 to an electro-surgery power generator (not shown). According to an embodiment of this presentation, the electrosurgery power generator is activable using a switch or pedal.

Figure 2:
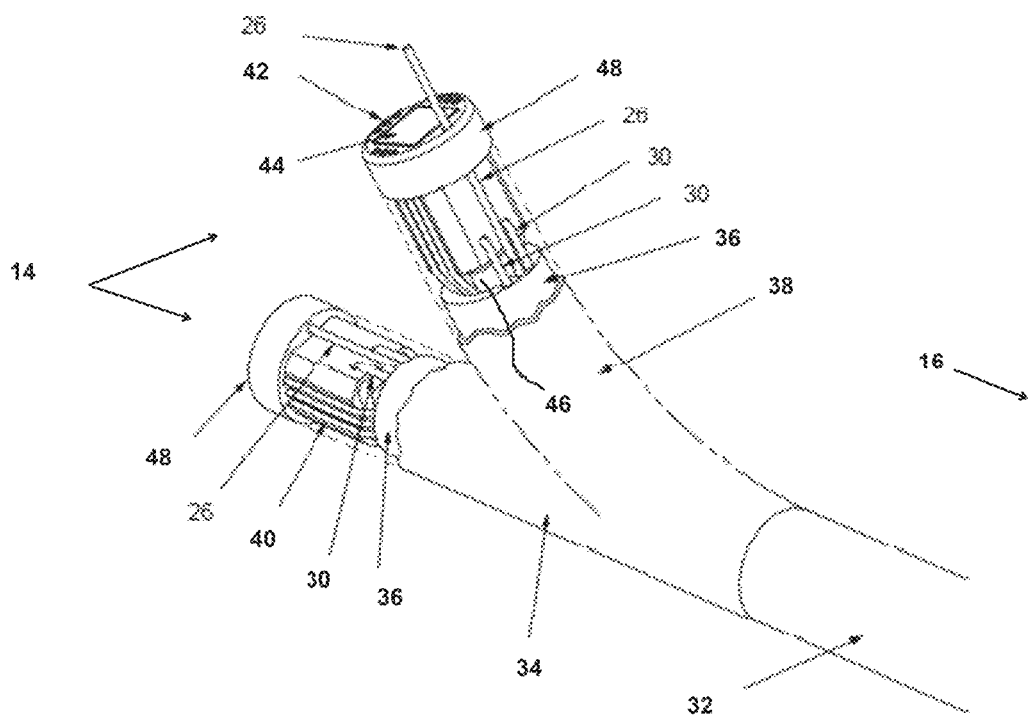
FIG. 2 is a detailed, partly opened, elevation view of the distal end of the micro-endoscope shown in FIG. 1.

FIG. 2 is a detailed, partly opened, elevation view showing the distal end 14 of an embodiment of the elongated member 12, in both unbent (straight) and bent positions.

According to an embodiment of this presentation, elongated member 12 has a cylindrical cross section and it comprises at least one tensioning wire 30 that runs in at least one tensioning wire lumen, or first lumen (not shown). As discussed hereafter, the tensioning wire exits the tensioning wire lumen at the proximal end of the elongated member.

According to an embodiment of this presentation, the elongated member 12 comprises a proximal portion 32 extending from the proximal end 16 toward the distal end 14 of the elongated member and a distal portion 34 extending from the distal end 14 to the proximal portion 32 of the elongated member 12. According to an embodiment of this presentation, the proximal portion 32 has a first durometer and the distal portion 34 has a second durometer, lower than the first durometer; the first lumen being arranged such that the distal portion of the elongated body bends when the proximal end of the at least one tensioning wire 30 is pulled. According to an embodiment of this presentation, the first durometer is chosen such that the proximal portion 32 is flexible enough to be inserted in a desired body cavity without damaging the cavity, and the second durometer is chosen with respect to the first durometer such that when the tensioning wire 30 is pulled, the distal portion 34 bends and the proximal portion 32 does not bend.

As outlined above, the elongated member 12 comprises an electrode wire lumen (not shown) and an electrode wire 26 is arranged in the electrode wire lumen such that the distal end of the electrode wire 26 does not protrude from the distal portion 34 of the elongated member 12 when the elongated member is not bent, and such that the distal end of the electrode wire 26 protrudes from the distal portion 34 of the elongated member when the elongated member is bent by more than a predetermined angle. The bottom left part of FIG. 2 shows the distal portion in a rest, unbent position, where electrode 26 does substantially not protrude from distal end 14 of the distal portion 34. The upper left part of FIG. 2 shows the distal portion in a bent position, where electrode 26 protrudes from the distal end 14 of the distal portion 34. Essentially, the bending of distal portion 34 is caused by an asymmetrical compression of distal portion 34 due to the pulling of tensioning wire 30. Because electrode wire 26 is not compressed, and because as detailed hereafter the proximal end of electrode wire 26 cannot move with respect to the proximal end 32 of the elongated member, the asymmetrical compression of distal portion 34 on the side of distal portion 34 that comprises the lumen run by electrode wire 26 causes the distal end of electrode wire 26 to protrude from the distal end 14 of the distal portion 34 of the elongated member 12.

As also illustrated in FIG. 2, the elongated member 12 comprises a core tube 36 held in an outer tube 38. As detailed hereafter in relation to FIGS. 12-16, the outer tube 38 can comprise a torque tube having an axial lumen with an inner diameter equal to, or slightly larger than, the outer diameter of the core tube 36; and a mesh-sheath wound around the torque tube. The torque mesh-sheath can be covered by an outer sheath.

According to an embodiment of this presentation, the electrode wire 26 can be coated with an insulator such as PTFE, which facilitates the sliding of the electrode wire 26 in the electrode wire lumen.

According to an embodiment of this presentation, the second durometer is chosen such that when the tensioning wire is relaxed after having been pulled, the distal portion tends to return to an unbent shape.

According to an embodiment of this presentation, the elongated member comprises a third lumen (not shown); at least one optical fiber 40 being arranged in the third lumen and having a proximal end (not shown) capable of receiving light from a source of light, and a distal end 42 capable of emitting from the distal end at least some of the light received at the proximal end. According to an embodiment of this presentation, the proximal end of the at least one optical fiber 40 is coupled with a connector for interfacing with a source of light, for example a connector 28 as shown in FIG. 1.

According to an embodiment of this presentation, the elongated member comprises a fourth lumen (not shown) and the distal end 14 of the elongated member comprises a camera 44, at least one wire 46 of the camera running through the fourth lumen. The at least one wire 46 of the camera can comprise a plurality of shielded wires, the proximal ends of which can be coupled to for example a connector 28 as shown in FIG. 1 for interfacing with an imaging device. According to an embodiment of this presentation, the camera 44 is aligned along the axis of the elongated member 12.

According to an embodiment of this presentation, the distal end 14 of the distal portion 34 comprises a head 48 made in a material different from the material of the core tube 36, a distal portion of the head 48 having the same cross section surface as the core tube with the torque tube, the torque braid and eventually the outer sheath such that the distal portion of the head seamlessly extends the portion of sheathed elongated member 12. According to an embodiment of this presentation, a proximal portion of the head 48 is provided for being inserted in a corresponding cavity formed at the distal end 14 of the elongated member 12, and for example glued into the cavity. According to an embodiment of this presentation, the distal end of the at least one tensioning wire 30 is attached to the head 48. According to an embodiment of this presentation, the camera 44 is attached in the head.

According to an embodiment of this presentation, the camera 44 can comprise a split lens that allows the camera to produce two images for generating a stereo image. According to an embodiment of this presentation, the camera 44 can comprise a twin-camera structure that produces two images for generating a stereo image.

According to an embodiment of this presentation, the head 48 comprises at least one lumen (not shown) through which passes the distal end of the electrode wire 26. According to an embodiment of this presentation, the head 48 can be made out of an insulator. Alternatively, the head 48 can be made out of metal and the lumen for the electrode wire 26 can be lined with an insulator. According to an embodiment of this presentation, the head 48 can comprise at least one lumen through which passes the distal end 42 of the optical fiber 40.

In the example illustrated in FIG. 2, elongated member 12 comprises two tensioning wire lumens side by side (not shown) in which two tensioning wires 30 run side by side. According to an embodiment of the present disclosure, the tensioning wire lumens are arranged such that the distal portion 34 of elongated body 12 bends when the proximal ends of the tensioning wires are pulled; while the proximal portion 32 of elongated body 12 remains unbent due to the difference in durometer of the distal and proximal portions. According to an embodiment of the present disclosure, each tensioning wire 30 is coated with a lubricant and is in direct contact with the inner walls of its lumen. According to an embodiment of the present disclosure the two tensioning wires 30 are arranged symmetrically on the diameter of elongated body 12 with respect to the electrode wire 26, such that pulling both tensioning wires 30 bends the distal end 34 of elongated member 12 generally toward the tensioning wires 30 along a plane containing both the axis of elongated member 12 and the electrode wire 26. According to an embodiment of the present disclosure, the distal end of the two tensioning wires 30 are attached to head 48. According to an embodiment of the present disclosure, the distal ends of the tensioning wires 30 are joined together (i.e. form a single wire) and run through a loop hole inside the proximal portion of the head 48.

According to an embodiment of the present disclosure, sheathed elongated member 12 has a circular cross-section with a diameter lower than 2 millimeter; preferably a diameter lower than 1 millimeter. According to an embodiment of the present disclosure, each tensioning wire 30 has a diameter of 0.15 millimeter or less.

According to an embodiment of the present disclosure, camera 48 can be replaced by a lens arrangement, in which case cable 46 can be replaced by a fiber optics bundle for transmitting to the proximal end of the elongated member light entering the lens at the distal end of the elongated member.

Figure 3A:
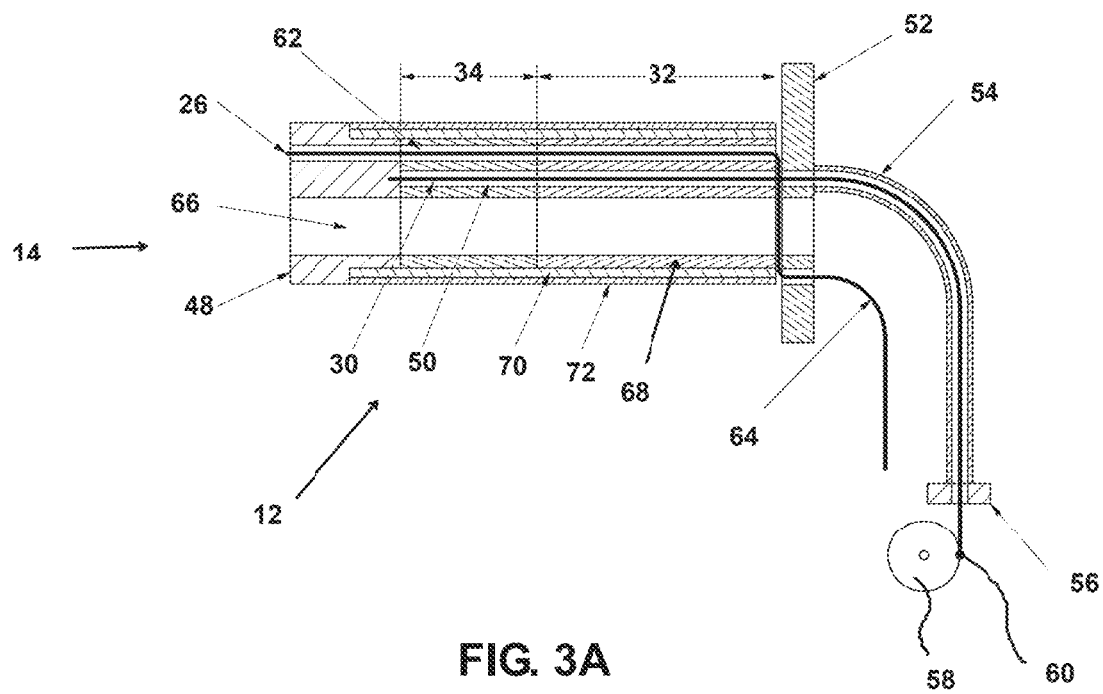
FIG. 3A is a schematic view of the elongated member of the micro endoscope shown in FIG. 1, in an unbent position.

FIG. 3A is a schematic view of the elongated member 12 of the micro endoscope shown in FIG. 1, in an unbent position. FIG. 3A shows one tensioning wire 30 running in a tensioning wire lumen 50 of elongated member 12. According to an embodiment of the present disclosure, the proximal end of the proximal section 32 of elongated member 12 is abutted to a flange 52. Tensioning wire 30 traverses flange 52 and runs in to the housing (not shown) through a flexible, axially incompressible, tensioning tube 54. Tensioning tube 54 comprises a flange 56 that is fixedly attached in the housing with respect to for example a tensioning wheel 58 that is rotatably attached in the housing. The proximal end 60 of tensioning wire 30 can for example be attached to a radius of tensioning wheel 58, such that a rotation of wheel 58 allows pulling wire 30 and bending elongated member 12.

As illustrated in FIG. 3A, according to an embodiment of this presentation, electrode wire 26 runs in an electrode wire lumen 62 of elongated member 12 until flange 52, where electrode wire 26 forms a loop (or "knee-bend") running along a portion of flange 52 before traversing flange 52. A proximal end 64 of electrode wire 26, in the housing, can be coupled to a power connector. According to an embodiment of this presentation, the length of electrode wire 26 in lumen 62 between the flange 52 and the distal end 14 is substantially equal to the length of the unbent elongated member, such that the electrode wire 26 remains within the lumen 62 when the elongated member 12 is unbent. FIG. 3A also shows elongated member 12 as comprising a camera lumen 66 for the camera and camera cable (not shown). FIG. 3A shows the elongated member 12 as comprising core tube 68 in which the lumens can be formed by extrusion, the core tube 68 being arranged in a torque tube 70 having an inner diameter equal to, or slightly larger than, the outer diameter of the core tube 68; a mesh-sheath 72 being wound around the torque tube 70. As detailed hereafter, core tube 68 can comprise two materials having different durometer or it can comprise a single material processed locally to give distinct durometer to the proximal and distal portions of the elongated member.

According to an embodiment of this presentation, the elongated member can be manufactured as detailed in PCT patent application No. PCT/US2015/027170, filed on Apr. 22, 2015 or U.S. provisional patent application No. 62/066, 340, filed on Oct. 20, 2014, both applications being incorporated by reference.

Figure 3B:
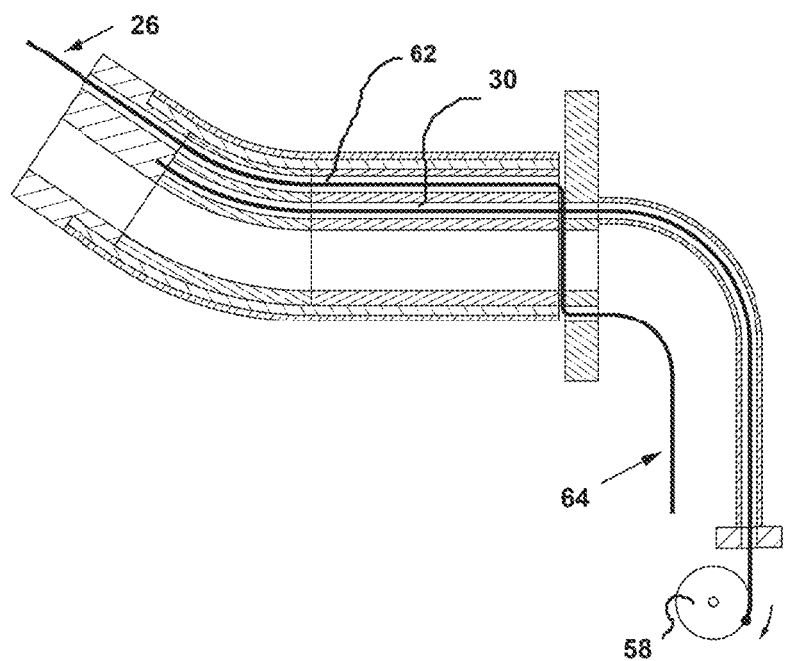
FIG. 3B is a schematic view of the elongated member of the micro endoscope shown in FIG. 1, in a bent position.

FIG. 3B is a schematic view of the elongated member of the micro endoscope shown in FIG. 1, in a bent position showing tensioning wire 30, attached to head 48, being pulled by a rotation of tensioning wheel 58, such that the distal portion 34 bends and such that the length of lumen 62 is reduced, thus exposing the distal tip of electrode wire 26. According to an embodiment of this presentation, if the tensioning wire 30 is pulled 1 mm, then 1 mm of electrode wire with be exposed, using a 1:1 ratio. According to an embodiment of this presentation, the electrode wire 26 can be made shorter than the elongated member 12, such that when the tensioning wire 30 is pulled just a little, the distal end 34 of the elongated member 12 bends without exposing the electrode wire 26. This allows navigating the distal end 34 of the endoscope without exposing the electrode wire 26.

Figure 4A:
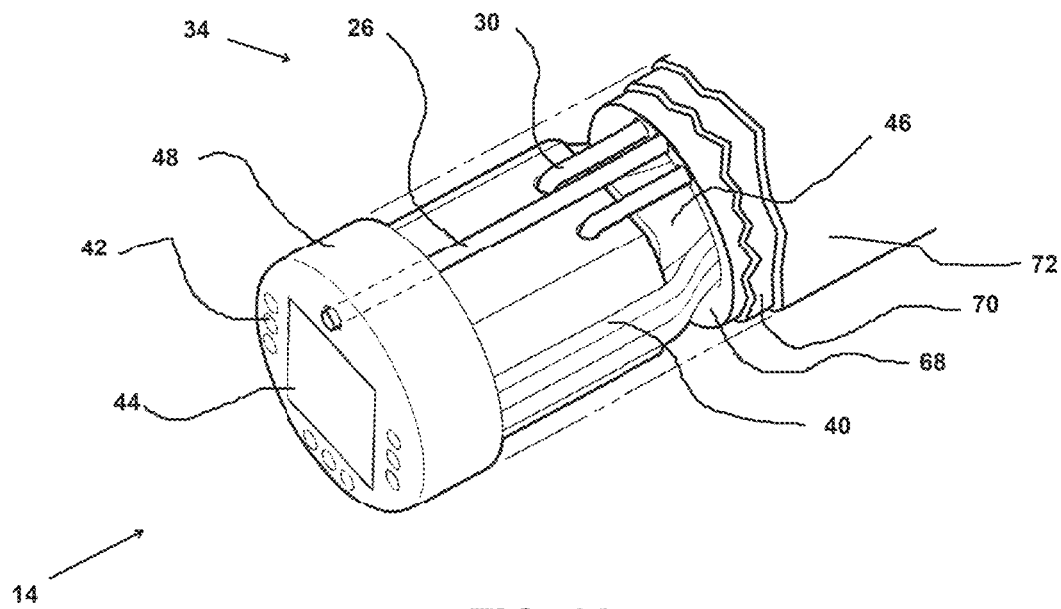
FIG. 4A is a close-up, partly opened, elevation view of the distal end of the micro endoscope shown in FIG. 1, with the electro-surgery electrode withdrawn.

FIG. 4A is a close-up, partly opened, elevation view of the distal end 14 shown in FIG. 2 with the electro-surgery electrode wire 26 withdrawn. As detailed above, electrode wire 26 remains withdrawn (within the lumen 62) as long as the distal portion 34 is not bent beyond a predetermined angle (of 0 degree or more).

Figure 4B:
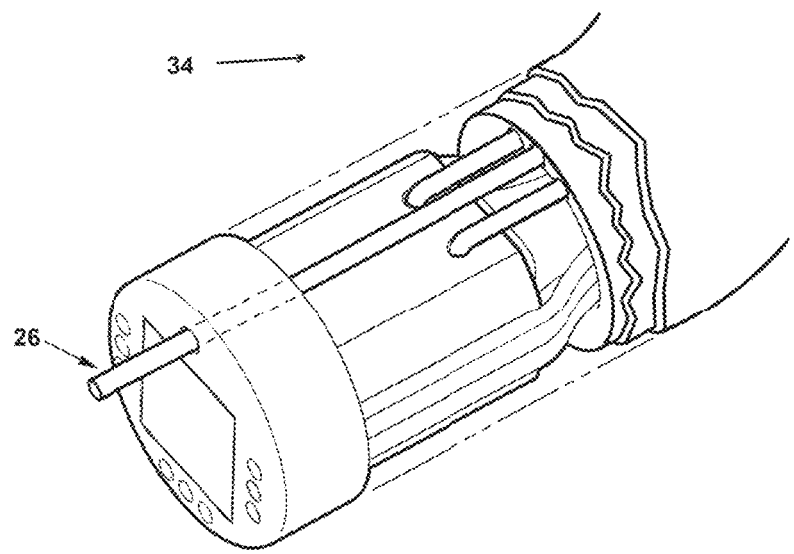
FIG. 4B is a close-up, partly opened, elevation view of the distal end of the micro endoscope shown in FIG. 1, with the electro-surgery electrode deployed.

FIG. 4B is a close-up, partly opened, elevation view of the distal end 14 shown in FIG. 2 with the electro-surgery electrode wire 26 deployed. As detailed above, electrode wire 26 is deployed (protrudes out of lumen 62) when the distal portion 34 is bent beyond a predetermined angle (of 0 degree or more).

Figure 5:
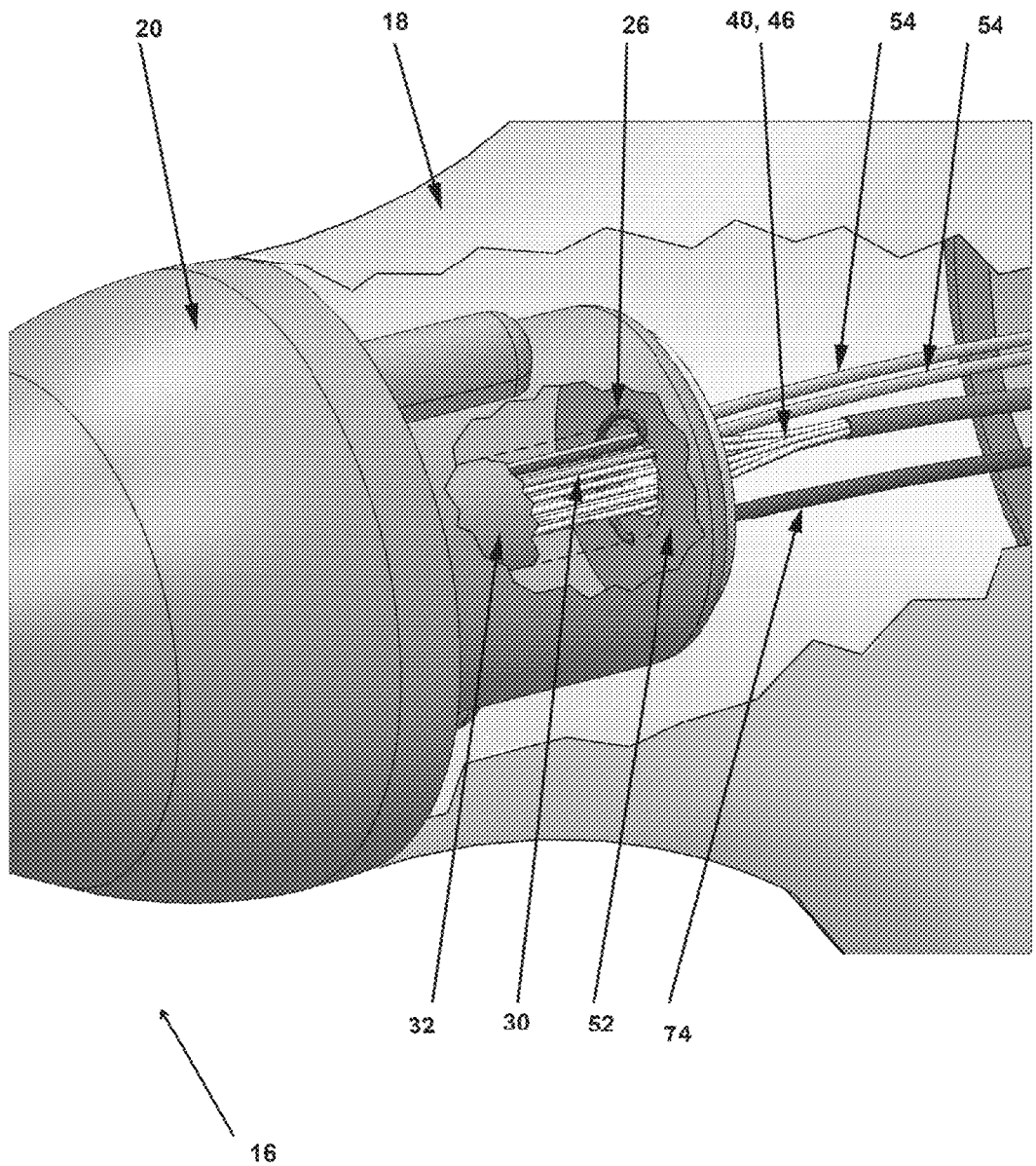
FIG. 5 is a close-up partly opened elevation view of an embodiment of the proximal end of the elongated member of the micro-endoscope shown in FIG. 1.

FIG. 5 is a close-up partly opened elevation view of an embodiment of the proximal end 16 of the elongated member of the micro-endoscope shown in FIG. 1. FIG. 5 shows in particular base 20, which is rotatable with respect to the housing 18 around an axis of the proximal end 16 of the elongated member 12.

As shown in FIG. 5, according to an embodiment of this presentation, the tensioning wire 30 passes through a flange 52 attached to base 20, then through a flexible tensioning sheath 54 that is not compressible axially between base 20 and a tensioning lever (not shown). FIG. 5 also illustrates electrode wire 26 forming a loop (or "knee-bend") running along a portion of flange 52 before traversing flange 52. According to an embodiment of this presentation, electrode wire 26 is arranged in an insulating sheath 74 in the housing from flange 52. FIG. 5 also illustrates the camera wires 46 and optical fibers 40 bundled together beyond flange 52 according to an embodiment of this presentation.

Figure 6:
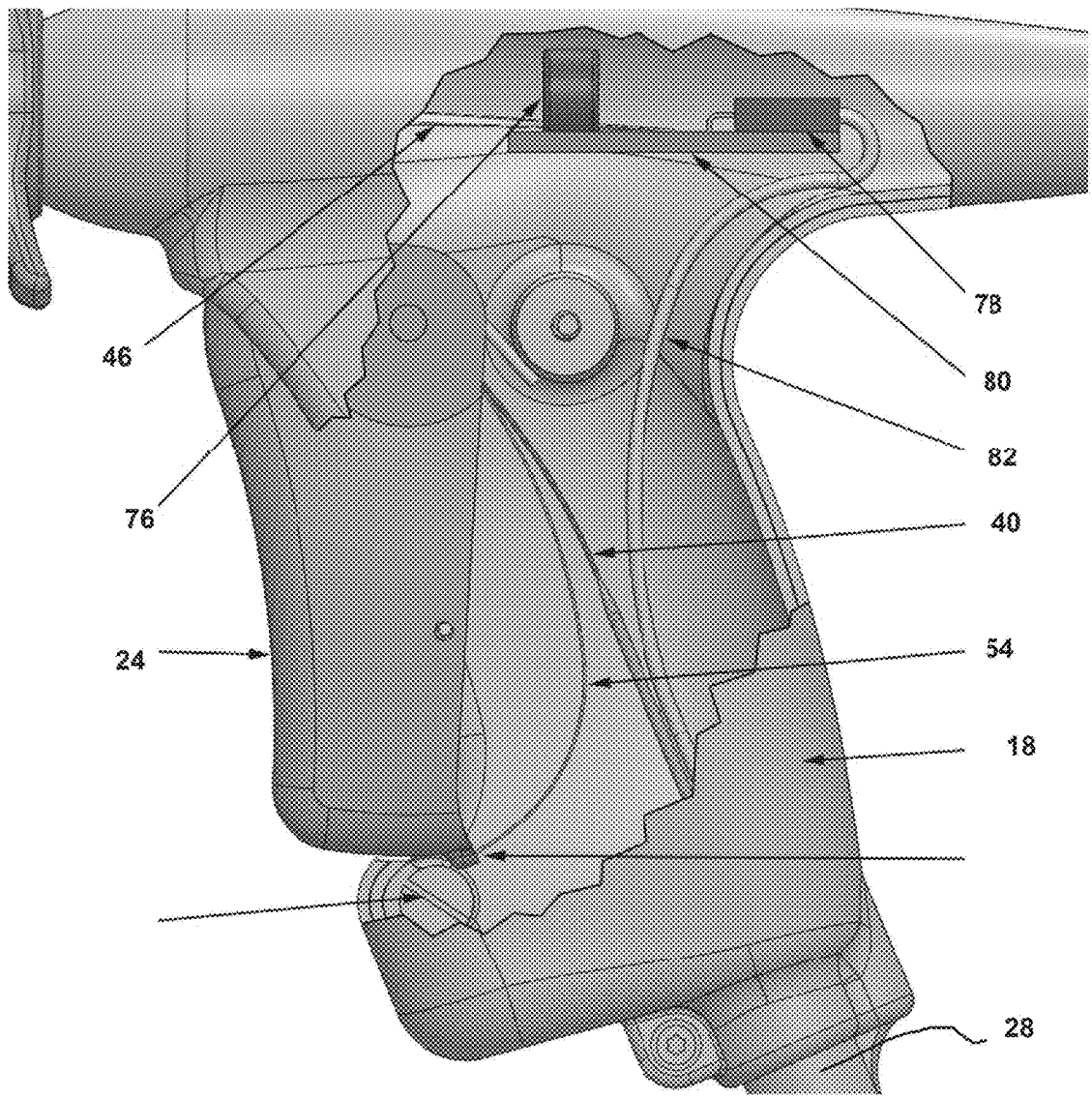
FIG. 6 is a close-up partly opened elevation view of an embodiment of the body of the micro-endoscope shown in FIG. 1.

FIG. 6 is a close-up partly opened elevation view of an embodiment of the body 18 of the micro-endoscope of FIG. 1, showing the camera wires 46 passing through a choke ferrite tore 76 and attached using a camera wire connector 78 on a coupling circuit support 80 to a shielded camera cable 82 going to connector 28. FIG. 6 also shows optical fibers 40 going to connector 28, as well as an embodiment of tensioning tube 54 where the proximal end of tensioning tube is attached to a mobile end of lever 24 and the proximal end of tensioning wire 30 is attached to the handle end of body 18, such that pressing the lever 24 moves tensioning wire 30 relative to tensioning tube 54 and thus with respect to the proximal end of elongated member 12, resulting in the bending of the distal portion of the elongated member 12.

Figure 7:
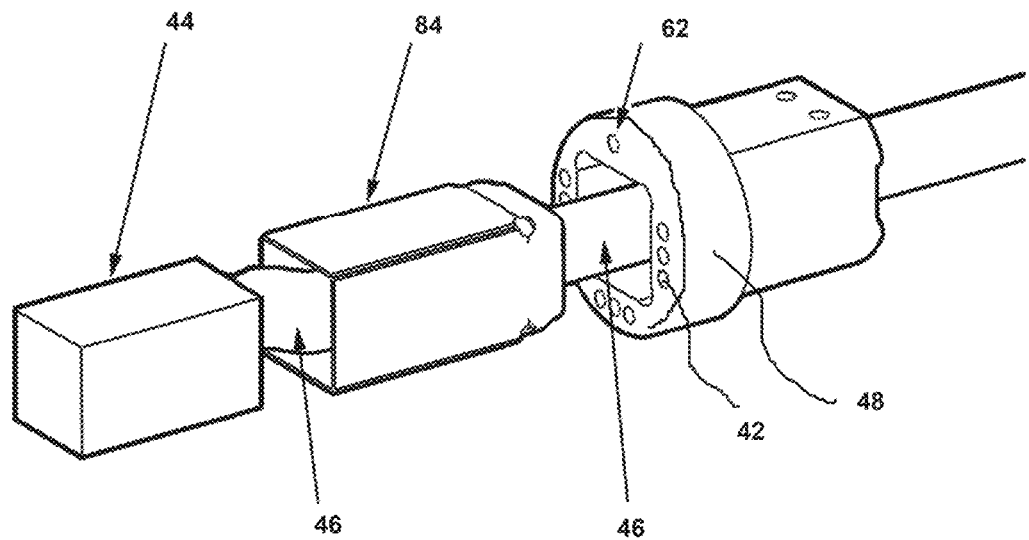
FIG. 7 is an exploded elevation view showing an embodiment of the camera, faraday shield and head of the distal end of the elongated member of the micro-endoscope shown in FIG. 1.

FIG. 7 is an exploded elevation view showing how camera 44 can be assembled in head 48 according to an embodiment of this presentation, wherein a Faraday shielding box 84 is arranged for enclosing at least the radial (lateral) sides of the camera 44, the shielded camera cable 46 being grounded to the Faraday shielding box. According to an embodiment of this presentation, the head 48 can be made of RF-shielded copper which is coated and insulated with a non-conductive black-oxide coating with photo-absorbing properties which will inhibit photons from reflecting on the inside surface and creating reflections on the sensor system.

According to an embodiment of this presentation, the camera 44 is shielded by being enclosed in faraday box 84 and the camera cable 46 is also shielded and coupled to at least one choke ferrite tore, such as choke ferrite tore 76 of FIG. 6. As detailed hereafter, according to an embodiment of this presentation, the electrode wire 26 (not shown in FIG. 7) is coupled to e.g. connector 28 (not shown in FIG. 7) provided for being connected to a source of power for dentistry electrosurgery, having a frequency close to 1.6 MHz. According to an embodiment of this presentation, the diameter of the electrode wire 26 is chosen such that it allows outputting a current density capable of performing electrosurgery with a power level sufficiently low to not disrupt the operation of the shielded camera 44, the distance between the edge of the shielded camera 44,84 and the electrode wire 26 being smaller than 0.5 millimeter.

As outlined above, embodiments of this presentation relate to a micro endoscope with highly integrated function of imaging, illumination, steering, electro-surgery in low cost, disposable, flexible plastic, catheter. A micro endoscope according to embodiments of this presentation provides a user such as a surgeon with an integrated device capable of performing complex procedure using one hand. To accomplish this objective the micro endoscope combines electrode deployment with the action of the steering beyond a desired angle. Simply by squeezing the trigger/lever 24, the user can deploy the electrode 26 and position the electrode 26 against the tissue to be cut assuring correct procedure.

In addition to challenges associated with micro-scale of the scope, forcing all components to perform dual or triple function, existence of electro-surgery electrode 26 next to the imaging device/camera 44 presents technical problem. It is known of the art that high AC voltage necessary for electro-surgery, causes RF and magnetic interference, and there exists a technical prejudice that arranging an electro-surgery electrode close to a camera will at least interfere with the operation of the camera, and will eventually destroy the camera itself if located too close to the camera.

Embodiments of this presentation overcome this technical prejudice by showing that for example, an electrosurgery electrode 26 having a diameter of 0.2 mm or less, and preferably 0.15 mm or less, located 0.5 mm or less from camera 44 protected by a faraday cage 84 having a distal opening of 0.5 mm×0.5 mm or less, does not interfere with the camera 44. Preferably, the electrosurgery electrode 26 is provided for being coupled to a 1.6 MHz electrosurgery power source. According to an embodiment of this presentation, the camera 44 can be a camera provided by the firm having the commercial name of CMOSIS. According to an embodiment of this presentation, the camera 44 can be a camera having the commercial name "NAN EYE STEREO". Such a camera has a footprint of 2.2×1 mm and height of 1.6 mm; its Faraday cage has a corresponding distal opening size.

It is also known that the closer a RF surgery electrode is to a conductor, such as a camera circuit or camera shielding, the larger the capacitive coupling will be between the electrode and the conductor, and the greater the electrode losses there will into the conductor. Embodiments of this presentation overcome this technical prejudice by showing that electrosurgery electrode 26 can be located 0.5 mm or less from a camera protected by a conductor without introducing losses that would prevent the operation of the camera or of the electrode by having an electrode diameter of 0.2 mm or less, and preferably 0.15 mm or less.

It is also known that the closer a RF surgery electrode is to a conductor, such as camera shielding 84 or camera cable 46, the more difficult it is to insulate the electrode properly. Embodiments of this presentation overcome this technical prejudice by showing that electrosurgery electrode 26 can be separated from camera 44 protected by a conductor shielding 84 or from camera cable 46 by 0.5 mm or less of a plastic like polyurethane or PolyetherBlock Amide, without introducing losses that would prevent the operation of the camera or of the electrode, by having an electrode with a diameter of 0.2 mm or less, and preferably 0.15 mm or less, coated with an insulator layer (such as PTFE or polyimide) of 20 micrometer or less. Surprisingly, the inventors have noted that the sides of the portion of the electrode wire 26 that is exposed out of the elongated member 12 for performing surgery (distal portion of the electrode wire) are preferably also coated with the insulator layer, since this allows insulating better the distal portion of the electrode from the other elements (in particular the camera) in the distal portion of the elongated member, while not preventing the distal portion of the electrode wire 26 from operating as an electosurgery electrode.

As outlined above, according to an embodiment of this presentation, squeezing the trigger/lever 26 activates/pulls the pull wire/tensioning wire 30 inside the endoscope microlumen, thus compressing the length of the elongated member 12. In the same time, the electrode wire 26, which is anchored at the proximal end of the elongated member 12, maintains its original length, eventually causing the distal end of the electrode wire 26 to extend from the distal end 14 of the elongated member 12. Once the electrode wire 26 begins to protrude from the distal end 14 of the elongated member 12, the length of the electrode extension is directly proportional to how much the trigger/lever 24 is squeezed. The more the lever 24 is squeezed the longer the extension of the electrode 26 and the deeper the cut. According to an embodiment of this presentation, the lever 24 comprises a lock that allows locking the lever 24 at a desired position, thus locking the electrode wire 26 with a desired extension.

A key feature of an embodiment of this presentation is the very small size/cross-section of the electrode wire 26. Despite apparently delicate and flimsy mechanical properties, a wire electrode having a diameter smaller than 0.2 mm, and even lower than 0.1 mm, has surprisingly proven to be a very reliable surgical tool. Importantly, as a consequence of the small size of the electrode wire 26 of embodiments of this presentation, the power density on the surface of exposed electrode wire 26 can be very high even at relatively low power, thus allowing to satisfactorily perform electrosurgery while supplying a low power to the electrode wire 26. According to an embodiment of this presentation, the power can be lower than 50 Watts for a frequency comprised between 1.5 and 1.7 MHz. Importantly, the lower power required by an electrode wire 26 according to embodiments of this presentation allows protecting efficiently the camera 44, with electrode 26 located less than 0.5 mm and up to 0.05 mm close to the camera 44, using a shielding such as 84 that takes up a minimal space.

According to embodiments of this presentation, the camera cable 46 also comprises shielding, as well as RF decoupling. According to embodiments of this presentation, a nearly fully enclosed Faraday shield 84 is created around the camera 44 with an opening just large enough for the lens of the camera 44. According to embodiments of this presentation, the camera shield 84 is an extension of a cable shield that extends the entire length of the cable 46. According to embodiments of this presentation, one or more toroidal ferrite cores 76 are used to increase the impedance of the cable 46 to lower the RF current flowing on the shield and cable conductors. According to embodiments of this presentation, a common mode choke is created by passing the camera cable through the core multiple times. According to embodiments of this presentation, several cores can be used to lower the RF current flow along the cable.

Remarkably, the inventors have noted that it is not necessary to ground a patient to be operated using electrosurgery performed with an electrode wire 26 of s micro-device according to embodiments of this presentation.

As detailed above, a micro-endoscope or device 10 according to an embodiment of this presentation comprises an elongated member 12 having micro lumen extrusions, an imaging camera 44, at least one illumination fiber 42, at least one pull wire 30, a distal head 48, a torque braid sheath 72 arranged around the elongated member 12, a proximal handle with a lever 24 for pulling the pull wire 30 and causing the distal portion 34 of the elongated member 12 to bend, thus eventually exposing an electrode wire 26 running in a lumen or micro-lumen of the elongated member 12, a connector 28 coupled to at least the electrode wire 26, a shielding camera box 84, shielding filters and capacitors coupled to the camera cable 46, and an electrode wire washer 52 to prevent the electrode wire 26 from being pulled when the elongated member 12 bends under the pull of the pulling wire 30.

According to embodiments of this presentation, the proximal end 16 of the elongated body 12 is attached to a base 20 rotatable with respect to the housing 18 that comprises lever 24. Combined with rotation of the whole assembly, an endoscope according to this presentation delivers 360° navigation and positioning of the electrode 26 precisely at the location of interest, verifiable by the image provided by the micro-camera 44. According to embodiments of this presentation, a torque braid sheath 72 and torque tube 70 applied to the outside layer of the elongated body 12 provides the rotational response of the elongated body 12 to torque forces without compromising flexibility of the scope. The complete micro-endoscope can be used in micro invasive trigger finger, or carpal tunnel release procedures eliminating a need for open hand surgery, which otherwise requires an operating room and an anesthesiologist.

Figure 8:
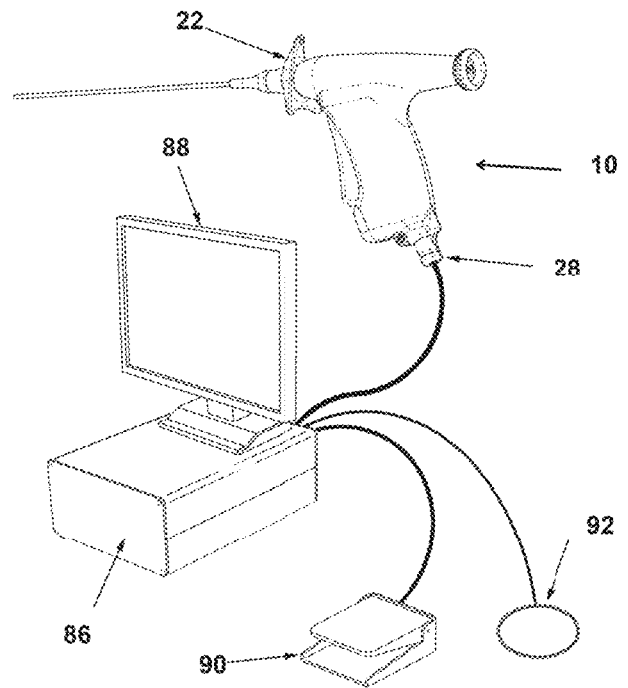
FIG. 8 shows the steerable electro-surgery micro-endoscope of FIG. 1 connected to a power and imaging module according to an embodiment of this presentation.

FIG. 8 shows the steerable electro-surgery micro-endoscope 10 of FIG. 1 connected to a power and imaging module according to an embodiment of this presentation, connected via connector 28 to a control box and electrosurgery generator 86, having also a display 88 for showing the images from the camera 44. According to an embodiment of this presentation, the powering up of the electrode wire 26 can be controlled from a switch external to the endoscope housing, for example a pedal 90 connected to the generator 86 by a control cable. According to an embodiment of this presentation, the generator 86 can comprise a patient grounding pad 92.

Figure 9:
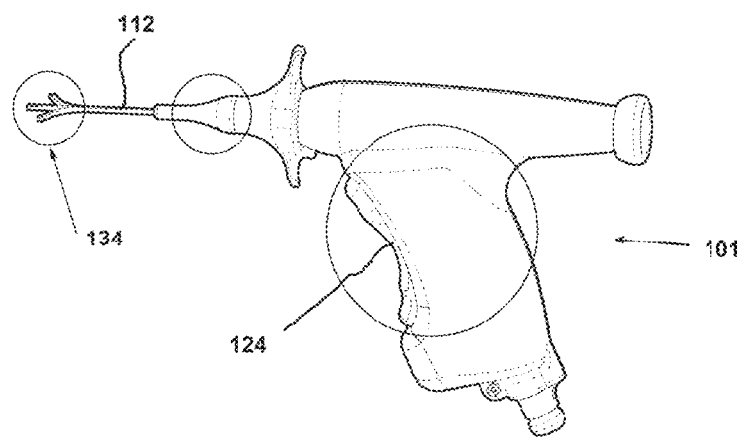
FIG. 9 is an elevation view of a steerable electro-surgery micro-endoscope 10 according to an alternative embodiment of this presentation.

FIG. 9 is an elevation view of a steerable electro-surgery micro-endoscope 100 according to an alternative embodiment of this presentation, that essentially differs from the micro-endoscope 10 of FIG. 1 by the fact that:

the elongated member 112 has a flattened cross section, thus distinguishing from the circular cross-section of elongated member 12 of FIG. 1; and the elongated member 112 comprises tensioning wires 130 running in lumen diametrally arranged so as to enable controllably turning the distal portion 134 of elongated member 112 in opposite directions.

Figure 10:
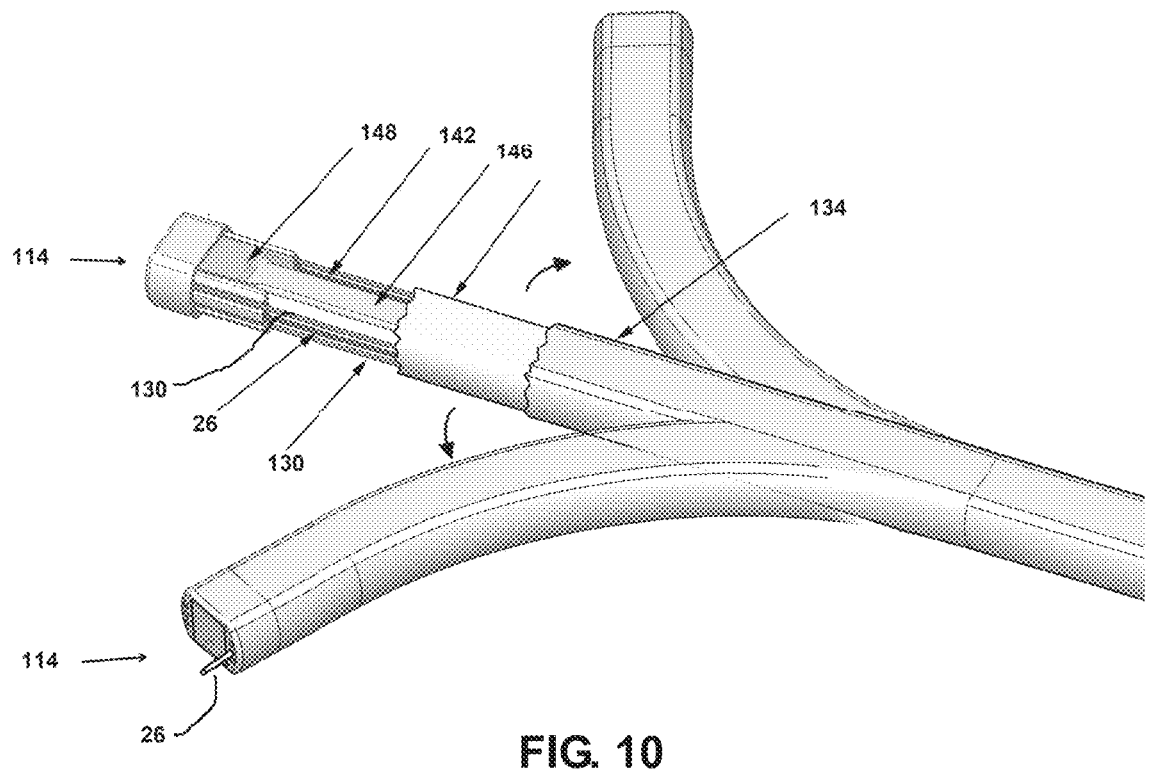
FIG. 10 is a detailed, partly opened, elevation view of the distal end of the micro-endoscope shown in FIG. 9.

FIG. 10 is a detailed, partly opened, elevation view of the distal portion 134 of the elongated member 112 shown in FIG. 9, in both unbent (straight) and bent positions.

According to an embodiment of this presentation, elongated member 112 has a flattened cross section (for example comprising two half-circles joined by straight lines) and it comprises at least two tensioning wire 130 that run in tensioning wire lumen (not shown) arranged symmetrically with respect to a symmetry plane containing the axis of the elongated member 112 and perpendicular to the flat sides of elongated member 112, so as to enable controllably turning the distal portion 134 of elongated member 112 in opposite directions with respect to said symmetry plane. Consistently with what discussed previously in relation with FIGS. 1-8, the distal ends of the tensioning wires 130 are attached to a head 148, and their proximal ends exit the tensioning wire lumen at the proximal end of the elongated member 112. The proximal ends of the tensioning wires 130 are attached to a symmetric lever 124 shown in FIG. 9, which allows pulling the tensioning wires 130 on either side of the symmetry plane. At least one wire 146 of the camera running through a camera lumen.

Consistently with what discussed previously in relation with FIGS. 1-8, one rounded side of the elongated member 112 comprises an electrode wire lumen (not shown) and an electrode wire 126 is arranged in the electrode wire lumen such that the distal end of the electrode wire 126 does not protrude from the distal portion 134 of the elongated member 112 when the elongated member is not bent toward that rounded side, and such that the distal end of the electrode wire 126 protrudes from the distal portion 134 of the elongated member 112 when the elongated member is bent by more than a predetermined angle toward the rounded side that comprises electrode wire 126. The bottom left part of FIG. 10 shows the distal portion 134 bent toward the rounded side that comprises electrode wire 126, with electrode wire 126 consequently protruding from the distal end 114 of distal portion 134. The middle left part of FIG. 10 shows the distal portion 134 in a rest, unbent position, where electrode 126 does substantially not protrude from distal end 114 of the distal portion 134. The upper left part of FIG. 10 shows the distal portion 134 bent toward the rounded side that does not comprise electrode wire 126, where electrode 126 does not protrude from the distal end 114 of the distal portion 134. The mechanisms allowing electrode 126 to protrude from, or remain hidden within, distal portion 134 are the same as those described for electrode 26 in relation with FIGS. 1-8. In addition in this embodiment, when the distal portion 134 is bent toward the rounded side of elongated member 112 that does not comprise electrode wire 126, the rounded side of elongated member 112 that comprises electrode wire 126 is not compressed and electrode 126 does not protrude from the distal end 114 of the distal portion 134.

According to an embodiment of this presentation, the rounded side of elongated member 112 that does not comprise electrode wire 126 can comprise a fiber optics lumen (not shown) run by a fiber optic 142 for bringing light to the distal end 114 of the distal portion 134.

Figure 11:
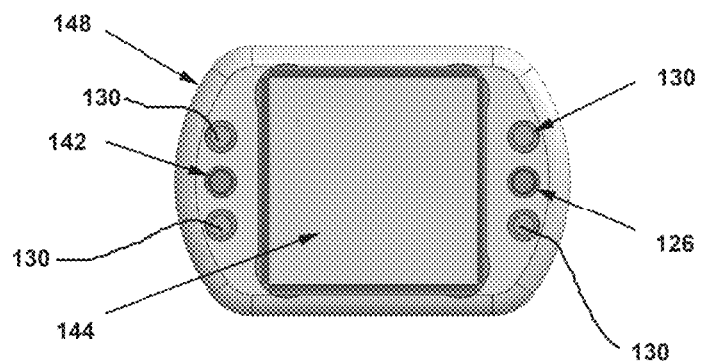
FIG. 11 is a front view of the distal end of the micro-endoscope shown in FIG. 9.

FIG. 11 is a front view of the distal end 114 of the micro-endoscope shown in FIG. 9, showing the distal end of head 148, comprising four sealed extremities of tensioning wires 130; the distal extremity of fiber optics 142, and the distal extremity of electrode wire 126.

Figure 12:
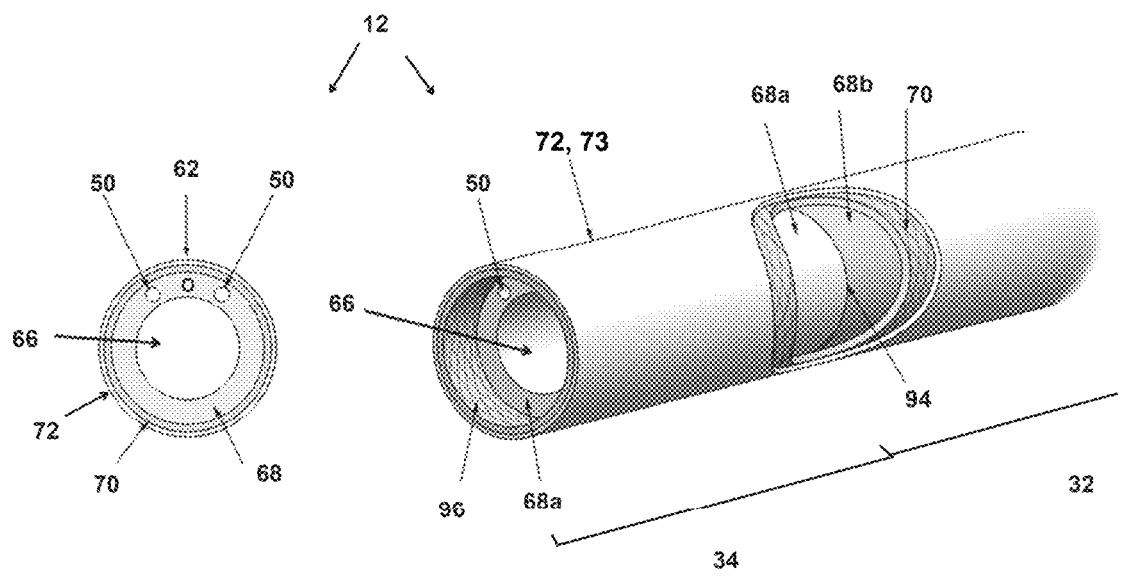
FIG. 12 is a detailed, partly opened, elevation view of a portion of the distal end of the elongated member micro-endoscope shown in FIG. 1.

FIG. 12 schematically shows a front view and an elevation view of the distal portion 34 and proximal portion 32 of a cylindrical elongated member 12 of a steerable microdevice (not shown) according to an embodiment of the present disclosure. According to an embodiment of the present disclosure, the distal portion 34 comprises a microextruded distal core tube 68a, having a first durometer, and a micro-extruded proximal core tube 68b having a second durometer, higher than the first durometer. According to an embodiment of the present disclosure, elongated member 12 comprises a main lumen 66 of the elongated member, through which for example the camera cable (not shown) can run. The extruded distal core tube 68*a* can be glued or thermal bonded or abutted to the extruded proximal core tube 68*b* at a bonding line 94. According to an embodiment of the present disclosure, elongated member 12 comprises at least one tensioning wire lumen 50 and one electrode wire lumen 62. According to an embodiment of the present disclosure, the core tubes are sheathed in a torque tube 70. According to an embodiment of the present disclosure, torque tube 70 is a hollow tube (i.e. a tube with a large axial lumen) that can be manufactured by extrusion. According to an embodiment of the present disclosure, a torque sheath 72 is tightly wound around extruded torque tube 70, forming an outer tube having an inner diameter equal to, or slightly larger than, the outer diameter of the core tubes. For example, the inner diameter of the outer tube (which is the inner diameter of the axial lumen of tube 70) can be 0 to 60 micrometer (preferably 0 to 50 micrometer) larger than the outer diameter of the core tube. The inventors have noted with surprise that a tube having a given outer diameter can efficiently be slid inside an outer tube having an inner diameter identical to, or slightly larger (0 to 60 micrometer larger) than said given outer diameter.

According to an embodiment of the present disclosure, extruded core tubes are pulled inside the outer tube. According to an embodiment of the present disclosure, core tubes are made of a resilient material, whereby their pulling slightly elongates them, thus reducing slightly their diameter and easing their pulling inside the outer tube.

According to an embodiment of the present disclosure, the distal end of the sheathed elongated member 12 can comprise a recess 96 formed by the distal core tube 68*a* being shorter than outer tube 70, 72. The recess 96 can be used for receiving a narrow proximal portion of the distal head (not shown) of the steerable micro-device.

According to an embodiment of the present disclosure, the proximal portion and the distal portion of the elongated member are extruded out of two different materials and are assembled together after extrusion. According to an embodiment of the present disclosure, the distal core tube 68*a* can be made of Polyether Block Amide (PEBA) or polyurethane for the portion having the lower durometer, with for example a durometer of 40 to 25 and the proximal core tube 68*b* of the elongated member can be made of Polyether Block Amide (PEBA) or polyurethane with for example a durometer of 80 to 75.

According to an embodiment of the present disclosure, torque mesh-sheath 72 is made of wires having a non-circular cross-section. According to an embodiment of the present disclosure, the torque mesh-sheath 72 is covered by an outer sheath 73.

Figure 13:
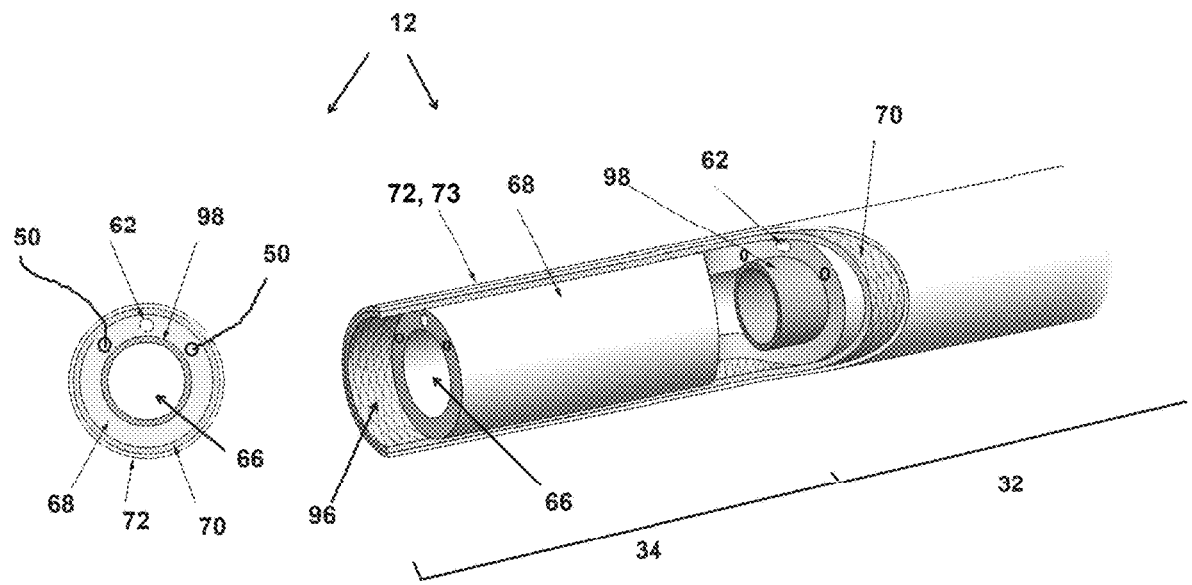
FIG. 13 is a detailed, partly opened, elevation view of a portion of the distal end of the elongated member micro-endoscope shown in FIG. 1.

FIG. 13 schematically shows a front view and an elevation view of the distal portion 34 and proximal portion 32 of a cylindrical elongated member 12 of a steerable micro-device (not shown) according to an embodiment of the present disclosure, wherein the proximal portion 32 and the distal portion 34 of the elongated member 12 are made out of a single material tube 68 (for example using micro-extrusion), and an inner sheath or tube 98 is inserted in at least one lumen of the elongated member 12, for example lumen 66, along the proximal portion 32 of the elongated member 12 to increase the durometer of the proximal portion 32 with respect to the durometer of the distal portion 24.

Figure 14:
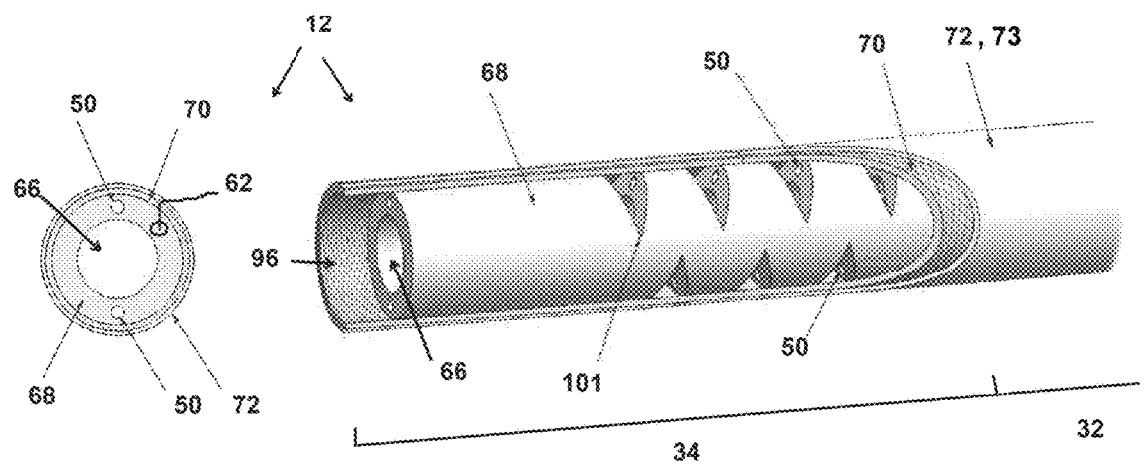
FIG. 14 is a detailed, partly opened, elevation view of a portion of the distal end of the elongated member micro-endoscope shown in FIG. 1.

FIG. 14 schematically shows a front view and an elevation view of the distal portion 34 and proximal portion 32 of a cylindrical elongated member 12 of a steerable micro-device (not shown) according to an embodiment of the present disclosure, wherein, the proximal portion 32 and the distal portion 34 of the elongated member 12 are made out of a single material tube 68 (for example using micro-extrusion), and matter is removed from tube 68 in the distal portion 34, forming recesses or notches 101, to lower the durometer of the distal portion 34 with respect to the durometer of the proximal portion 32.

Figure 15:
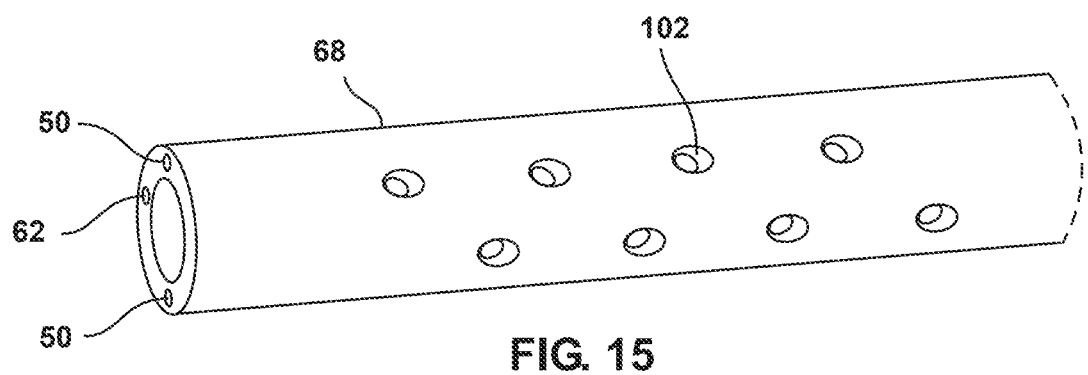
FIGS. 15 and 16 schematically illustrate alternative structures for the elongated member shown in FIG. 14.

FIG. 15 shows an elevation view of an alternative core tube 68, which instead of the cuts or notches 101 shown in FIG. 14 comprises bores 102 along an axis that differs from the axis of the elongated member 12.

Figure 16:
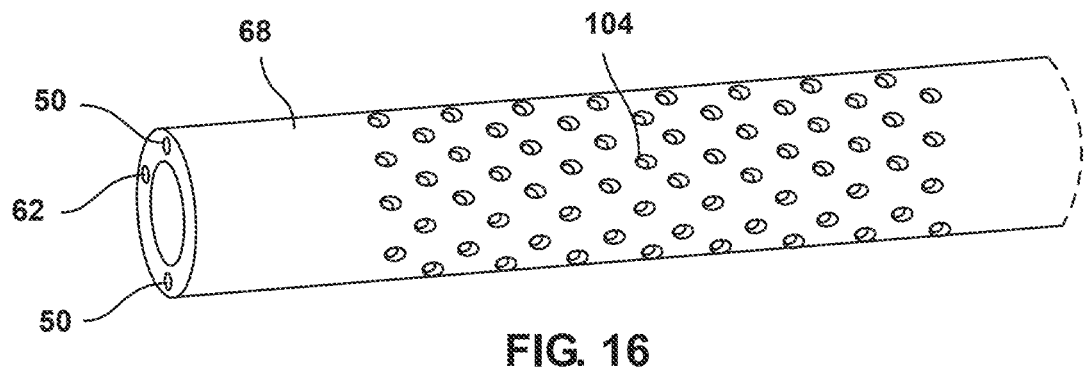

FIG. 16 shows an elevation view of an alternative core tube 68, which instead of the cuts or notches 101 shown in FIG. 14 comprises micro-holes 104 obtained by treating chemically a desired portion of micro-extruded tube 68.

A steerable micro-device according to an embodiment of this presentation has been designed for medical inspection inside the body (for human or veterinary use) with the capability of cutting tissue, steering and to be as small as possible with the required shielding system that is necessary due to incorporation of the cutting electrode. Because the scope is commonly used to view a cavity inside the body which has no available light, a lighting component is added using fiber optic cable to deliver the illumination at the distal end on all four sides of the imaging sensor. In addition, this scope is designed to use relatively inexpensive parts such that it is disposable after use in a procedure.

The chip camera is sensitive to external electromagnetic fields that can interfere with internal analog and digital circuits that can cause image artifacts or completely disrupt the image. For the camera to deliver quality images while in close proximity to RF fields, special shielding and RF current decoupling techniques are utilized. Not only the camera circuits are sensitive but also the cable carrying power to the camera and the bidirectional high speed digital signaling between the camera and USB controller (which connects to a computer for viewing of the image.)

A solution to maintaining image quality in the presence of strong RF fields is a combination of shielding and RF decoupling. A nearly fully enclosed Faraday shield is created around the camera with an opening just large enough for the lens. The shield is an extension of the cable shield that extends the entire length of the cable. Toroidal ferrite cores are used to increase the impedance of the cable to lower the RF current flowing on the shield and cable conductors. A common mode choke is created by passing the cable through the core multiple times. Several cores are used to lower the RF current flow along the cable.

A surgeon can locate area of interest by camera & with one single movement (with the handle) can create bias in the electrode by e.g. a 1:1 ratio in the amount of the desired length of the cutting electrode, and then push the pedal (refer to drawings) to trigger the cutting action.

According to embodiments of this presentation, the electrosurgery generator can additionally comprise a pulse trigger feature (minimum to maximum to continuous), that allows introducing a programmable length of electrical activity/duration-of-activation. According to embodiments of this presentation, the electrosurgery generator can additionally comprise an impedance monitoring feature for arcing protection and security for the cut.

As detailed above, according to embodiments of this presentation, instead of using round wire, the torque braid/ mesh 72 can advantageously use flat ribbon which allows for approximately ½ the thickness of that of round wire, which means that the resulting thickness of the torque braid is half of what it would be if it was made out of round braided wires. The catheter remains flexible and with very high performance against twisting without compromising the steering flexibility properties of the system. Preventing twisting during rotation is a key feature of the system as designed.

Stop washer 52 must be constructed by the best insulator on the market. Distal head must be constructed of highly insulated material (perhaps ceramic). Ceramic is particularly attractive material due the insulative and temperature resistant properties and mechanical properties allowing for micro-scale fabrication.

This presentation also relates to a method of manufacturing a steerable micro-device such as disclosed in PCT patent application No. PCT/US2015/027170, filed on Apr. 22, 2015 or U.S. provisional patent application No. 62/066,340, filed on Oct. 20, 2014, both applications being incorporated by reference.

FIG. 17 is an elevation view of a catheter 200 according to an embodiment of this presentation, the catheter comprising an elongated member 202 of cylindrical shape, comprising first 204 and second 206 lumens extending each between a distal end 208 and a proximal portion 210 of the elongated member 202. The elongated member 202 comprises a longitudinal wave-shaped opening 212 along the whole length of the second lumen, or guiding lumen, 206, at least between the distal end 208 of the elongated member and a proximal portion 210 of the elongated member 202. According to an embodiment of this presentation, the longitudinal wave opening 212 can follow a periodic pattern such that the edges of the lateral opening 212 form complementary protrusions. The periodic pattern can be a sinusoidal pattern.

According to an embodiment of this presentation, the elongated member 202 can have a circular cross section or a non-circular cross section. As illustrated in FIG. 18A, which is a close-up view of the distal end 208 of elongated member 202, the guiding lumen 206 has a cross section that is larger than the cross section of the first lumen 204, or work lumen and elongated member 202 can comprise a plurality of work lumens 204.

According to an embodiment of this presentation, the proximal end 214 of elongated member 200 is coupled to at least one connector 216 in fluid connection with at least one work lumen 204. According to an embodiment of this presentation, work lumen 204 is provided for transferring a fluid from the proximal end 214 of the elongated member 202 to the distal portion 208 of the elongated member, or reciprocally. One or more fluid connector 216 can comprise a fluid diode.

According to an embodiment of this presentation, the work lumen 204 comprises an optical fiber for transferring light from the proximal end 214 of the elongated member 202 to the distal end 208 of the elongated member 202, or reciprocally. In such embodiment, at least one of the illustrated connectors 216 would be a fiber optic connector coupled to the optical fiber running in the associated work lumen 204.

According to an embodiment of this presentation, the distal end 208 of the elongated member 202 can comprise a camera (not shown) fitting in the distal end of work lumen 204, and the camera cable can run in the work lumen 204 toward the proximal end of the catheter. Such embodiment can be particularly useful if the catheter is coupled to an endoscope that has no camera, or a camera operating with different light wavelengths as compared to the camera in the catheter.

According to an embodiment of this presentation, the distal end 208 of the elongated member 202 can comprise a surgical tool such as an electrosurgery tool or an ultrasound tool or a biopsy tool (not shown) and the first lumen comprises at least one wire for controlling the surgical tool.

Working channels/lumens 204 can be used for suction, irrigation or any other use that may be needed for a therapy procedure including different modality of imaging or laser ablation (or other electro-surgery methods.)

As illustrated in FIG. 18B, which is a close-up view of the proximal portion 210 of elongated member 202, the longitudinal opening 212 ends in the proximal portion of the elongated member 202 with a longitudinal gap opening 218 as wide as the second lumen 206.

FIG. 19 is a front view of the distal end of the catheter 200, coupled to a micro endoscope 10, 100 such as shown in FIGS. 1-11, and in particular a micro endoscope 100 such as shown in FIGS. 9-11. Assembly of the catheter 200 with the micro-endoscope 100 is detailed hereafter. According to an embodiment of this presentation, the catheter 200 is provided for being coupled to a micro-endoscope 100 by having the cross-section of guiding lumen 206 slightly larger than the outer cross section of the elongated member 112 of micro-endoscope 100. According to an embodiment of this presentation, the cross-section of guiding lumen 206 can also be smaller or larger than the outer cross section of the elongated member 112 of micro-endoscope 100.

According to an embodiment of this presentation, the elongated member 202 comprises a first longitudinal portion 220 and a second longitudinal portion 222. According to an embodiment of this presentation, the first longitudinal portion 220 forms the elongated member 202 around a portion of the guiding lumen 206 on both sides of the longitudinal opening 212; and the second longitudinal portion 222 forms the elongated member 202 around the work lumen(s) 204 and the remainder of the guiding lumen 206.

According to an embodiment of this presentation, the first longitudinal portion 220 is made of a first material having a first durometer, and the second longitudinal portion 222 is made of a second material having a second durometer lower than the first durometer. According to an embodiment of this presentation, the first durometer is of 55 and the second durometer is of 25. According to an embodiment of this presentation, the elongated member 202 is manufactured by extruding concurrently the first 220 and second 222 longitudinal portions.

According to an embodiment of this presentation, the first and second materials are a single material; the second durometer being obtained by chemically treating, and/or mechanically treating the material to lower its durometer, including by forming cuts or holes in the material.

According to an embodiment of this presentation, the longitudinal opening 212 is such that both sides of the longitudinal opening 212 are distant by a distance smaller than the width of the guiding lumen 206 when the guiding lumen is empty. According to an embodiment of this presentation, the longitudinal opening is such that both sides of the longitudinal opening 212 are in contact when the guiding lumen 206 is empty.

According to an embodiment of this presentation, the periodic shape can be such that the opposite edges of the lateral opening 212 interlock, similarly to the way the two parts of a "zipp"er interlock. For example, the periodic shape can comprise sections of circles attached to one edge of the lateral opening by narrower portions, the bases of the narrower portions being coupled together by arcs of circle so as to correspond in negative to complementary sections of circle attached to the other edge of the lateral opening.

According to an embodiment of the present application, the edges of the lateral opening 212 forming complementary protrusions help maintaining the guiding structure within the guiding lumen when the catheter is slid along curves of the guiding structure, even if the complementary protrusions do not interlock as a "zipp"er.

Figure 20:
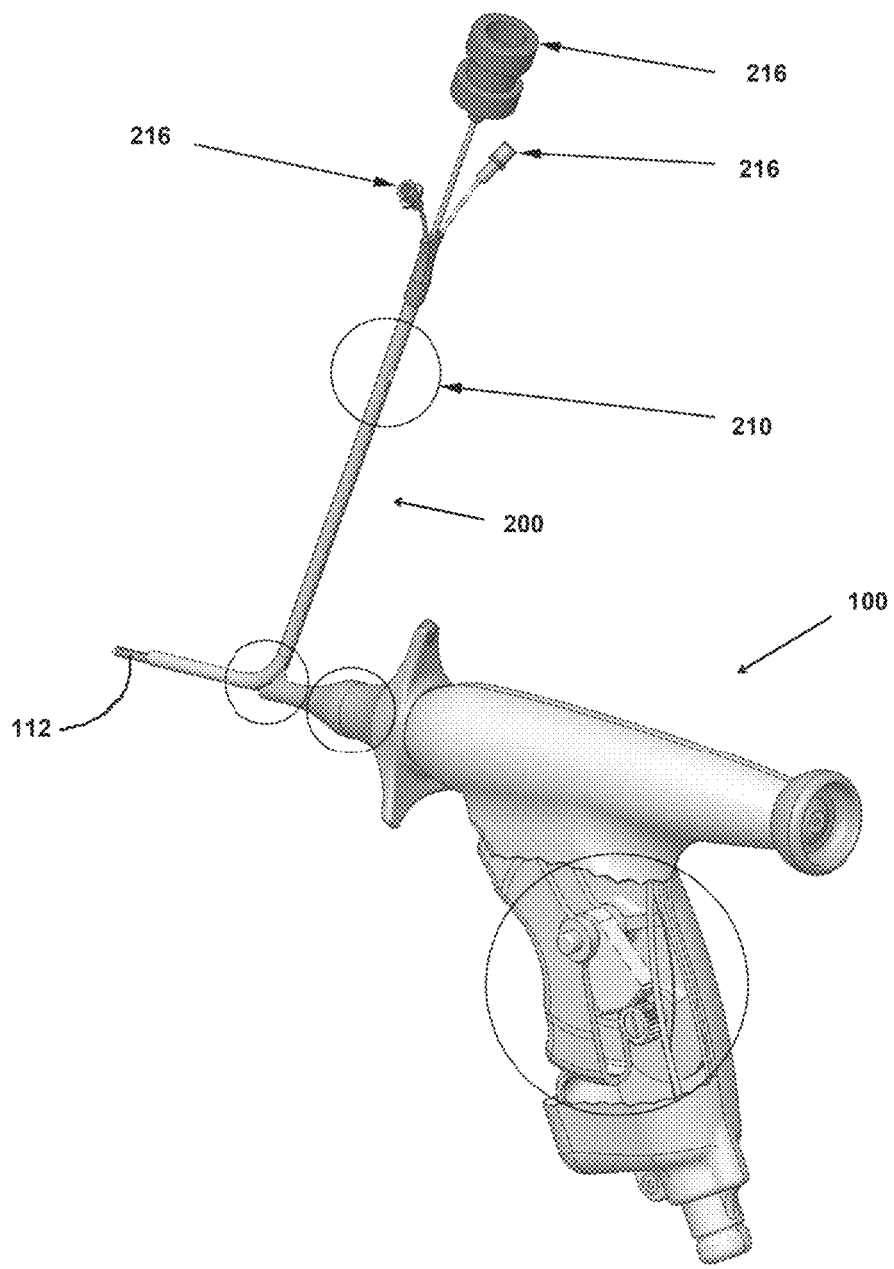
FIG. 20 is an elevation view showing the coupling of a catheter as shown in FIG. 18 with a micro endoscope such as shown in FIGS. 1-11.

FIG. 20 is an elevation view showing the coupling of a catheter 200 as shown in FIG. 18 with a micro endoscope 100 such as shown in FIGS. 9-11.

A catheter 200 according to embodiments of this presentation, having a lateral wave opening 212 along the whole length of its guiding lumen 206, which extends from its distal end 208 to a proximal portion 210 of the catheter 202, can advantageously be introduced around a guiding structure such as a guiding wire or an endoscope 10 or 100 as detailed above without having access to the proximal end itself of the guiding structure.

Advantageously, the edges of the lateral opening 212 of the guiding lumen 206 can be separated and then closed around a desired proximal portion of the guiding structure (e.g. proximal portion 32 of elongated member 12). According to an embodiment of this presentation, the catheter 200 is then pushed in a direction toward the distal end of the guiding structure while the edges of the lateral opening of the guiding lumen are maintained open upstream of the desired proximal portion of the guiding structure.

Figure 21:
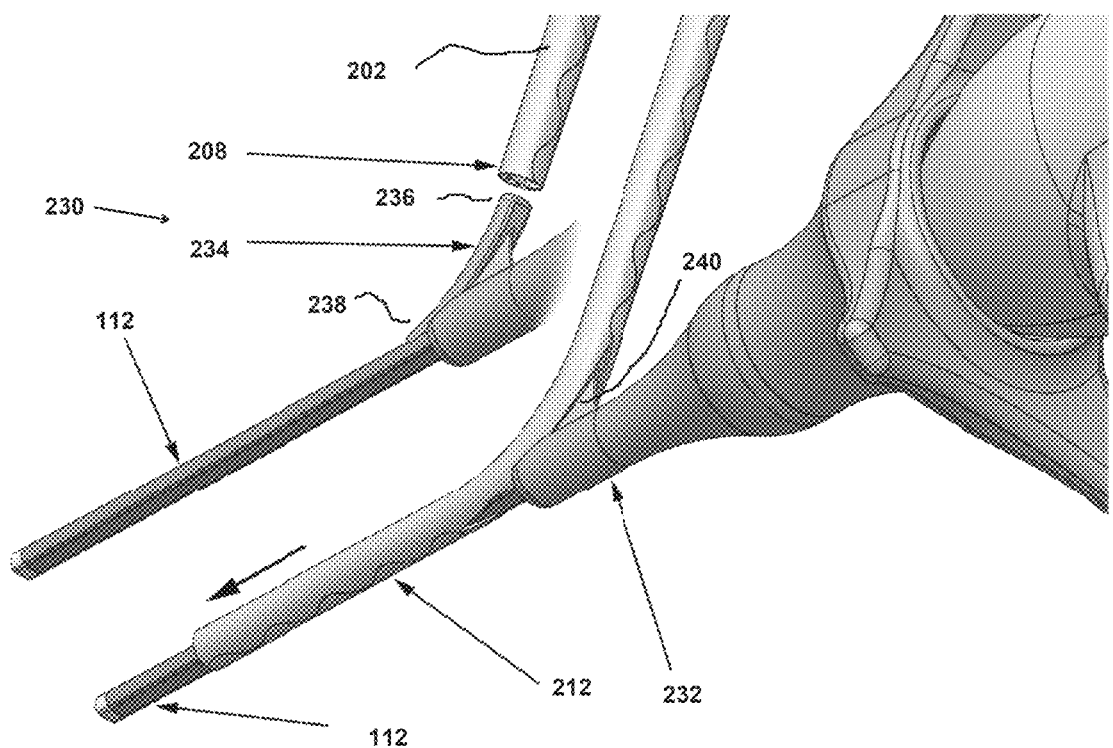
FIG. 21 is an elevation view showing in detail two steps of the coupling illustrated in FIG. 20.

FIG. 21 is an elevation view showing in detail two steps of the coupling illustrated in FIG. 20, using a coupler 230 according to an embodiment of this presentation. According to an embodiment of this presentation, coupler 230 is provided for installing around an elongated guiding structure such as an elongated member 112 as illustrated in FIGS. 9-11 a resilient tube such as elongated member 202 of FIG. 18, having a guiding lumen 206 with a longitudinal opening 212 along its length. According to an embodiment of this presentation, the coupler 230 comprises a base 232 capable of being attached to a proximal portion of the elongated guiding structure 112; a curved branch 234 having a first end 236 capable of being inserted in the guiding lumen 206 of the tube 202 and a second end 238 having a wall tangent to the proximal portion of the elongated guiding structure when said base is attached to said proximal portion of said elongated guiding structure 112; and a wedge 240 arranged between the base 232 and the curved branch 234 for separating the edges of the longitudinal opening 212 of the tube 202 when the tube 202 is moved in a first direction from the first end 236 to the second end 238 of the curved branch 234, such that the elongated guiding structure 112 is comprised between the separated edges of the longitudinal opening 212 of the tube 202 when the tube reaches the second end 238 of the curved branch 234.

According to an embodiment of this presentation, the coupler 230 is arranged such that the portion of the resilient tube 202 that moves away from the second end 238 of the curved branch 234 as the tube 202 keeps being pushed along the first direction closes around the elongated guiding structure 112.

According to an embodiment of this presentation, using coupler 230 the edges of the lateral opening 212 of the guiding lumen 206 of the catheter 202 can be separated and then closed around a desired proximal portion of the guiding structure 112. When the catheter/tube 202 is pushed along the guiding structure 112 such that the guiding structure takes the whole guiding lumen 206, the proximal portion of the guiding structure 112 protrudes from the catheter through the proximal lateral gap opening 218 of the catheter 202. According to an embodiment of this presentation, a lock can be provided to lock the catheter 202 closed around the lateral gap opening 212 of the catheter, to prevent the catheter 202 from slipping back along the guiding structure 112. According to an embodiment of this presentation, the coupler 230 can be provided for being fixedly coupled to the desired proximal portion of the guiding device 112. According to an embodiment of this presentation, the guiding device 112 can be a steerable micro-device as described in this presentation, it can also be a known guiding wire or a known endoscope or an endoscope such as disclosed in PCT patent application No. PCT/US2015/027170, filed on Apr. 22, 2015 or U.S. provisional patent application No. 62/066,340, filed on Oct. 20, 2014.

Figure 22:
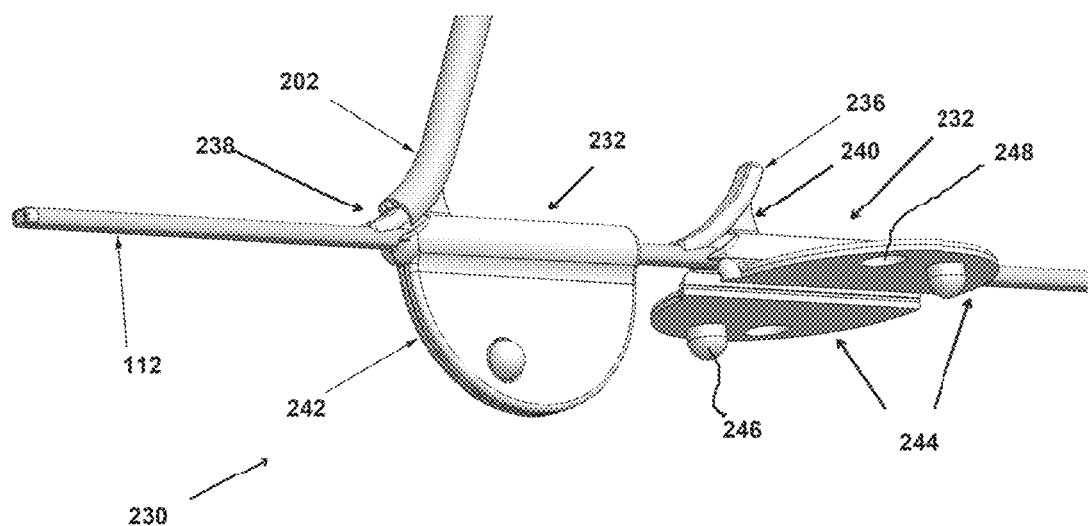
FIG. 22 is an elevation view showing a removable coupler for coupling a catheter as shown in FIG. 18 with a micro endoscope such as shown in FIGS. 1-11.

FIG. 22 is an elevation view showing a removable coupler 230 for coupling a catheter 202 as shown in FIG. 18 with a micro endoscope 100 such as shown in FIGS. 1-11, wherein the base 232 of the coupler 230 comprises a lock 242 for attaching the coupler 230 to the proximal portion of the elongated guiding structure 112. As illustrated in FIG. 22, lock 242 can comprise two flaps 244 hinged to a half cylinder base 232; at least one flap 244 comprising at least one spring-mounted protrusion 246 arranged to removably lock into a hole 248 provided in the other flap 244. According to an embodiment of this presentation, the base 232 and flaps 244 are arranged to lock on guiding structure 112 when the spring-mounted protrusion 246 is locked into hole 248.

Figure 23:
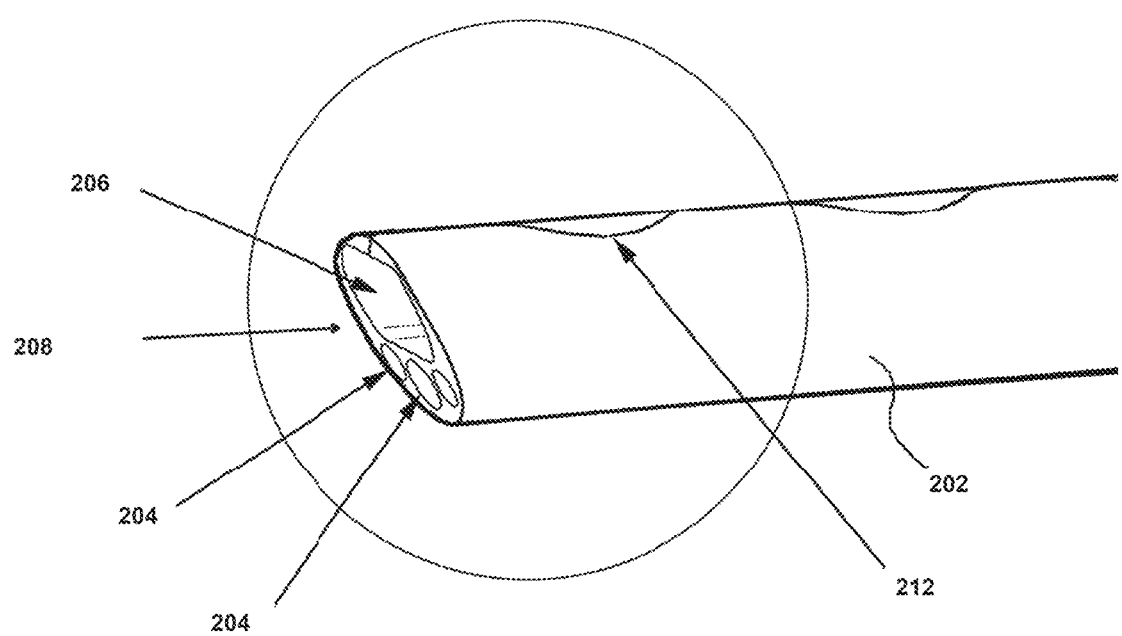
FIG. 23 is an elevation view of the distal end of a catheter as shown in FIG. 18 according to an embodiment of this presentation.

FIG. 23 is an elevation view of the distal end 208 of a catheter 202 as shown in FIG. 18 according to an embodiment of this presentation wherein the distal end 208 of the "zipp" catheter comprises a surface slanted with respect to the axis of the catheter 202 such that the guiding lumen or "zipp" lumen (206) opens closer to the distal portion of the slanted surface and the working lumens (204) open closer to the proximal portion of the slanted surface.

According to an embodiment of this presentation, the guiding lumen 206 has a diameter larger than the diameter of the guiding structure 112, such that the guiding structure 112 can slid with only moderate frictions within the guiding lumen 206.

Alternatively, the guiding lumen 206 can have a diameter equal to or smaller than the diameter of the guiding structure 112, in which case the edges of the lateral opening 212 of the guiding lumen 206 barely contact or do not contact when the guiding structure 112 is slid in the guiding lumen 206.

According to an embodiment of this presentation, the guiding lumen 206 can be coated with a lubricant material, such as Polytetrafluoroethylene (PTFE) or Polyimide.

According to an embodiment of this presentation, the catheter 202 can be made of Polyether Block Amide (PEBA) or polyurethane for the portion having the lower durometer, for example a durometer of 40 to 25 and Polyether Block Amide (PEBA) or polyurethane for the portion having the higher durometer, for example a durometer of 80 to 75.

According to an embodiment of this presentation, the catheter can have a diameter of 2.6 mm with a guiding lumen having a diameter of 1.5 mm and at least one work lumen having a diameter of 0.7 mm, for coupling on a steerable micro endoscope as detailed previously.

According to an embodiment of this presentation, the guiding structure 112 can have a cross section that is not circular.

According to an embodiment of this presentation, the guiding structure 112 can have a flattened cross section that comprises two half-circles joined by straight lines.

According to an embodiment of this presentation, the guiding lumen 206 has a cross section that matches the shape of the cross-section of the guiding structure 112.

Advantageously, when the guiding structure 112 has a flattened cross section, such as the micro-endoscope detailed hereabove, a "zipp" catheter 202 according to embodiments of this presentation, with a cross section that matches the shape of the cross-section of the guiding structure, when coupled to the guiding structure, maintains a good coupling when the guiding structure 112 is rotated along its longitudinal axis.

According to an embodiment of this presentation, the guiding structure 112 is a steerable micro device having an elongated member 112 with a distal end 134 capable of controllably bending to the left or to the right of the longitudinal axis of the elongated member, in a plane that can be controllably rotated by rotating a proximal portion of the elongated member. As outlined in FIG. 19, the guiding structure 112 can comprise a camera 144 as well as one or more optical fibers 142 for transmitting light from the proximal end to the distal end of the elongated member, and an electrode wire 126. A catheter according to this presentation can be used to bring a tool to the distal end of the guiding structure, and/or to remove a liquid, and/or to introduce a liquid at the distal end of the guiding structure.

The representation of the working channels 204, for example in FIG. 19, is one of several open configurations. The number and size of the working channels 204 can vary according to the application. The "zipp"/guiding lumen 206 for the endoscope elongated member 112 is the only channel that will remain identical for all catheters of that family. Working channels 204 can be used for suction, irrigation or any other use that may be needed for a therapy procedure including different modality of imaging or laser ablation (or other electro-surgery methods.)

According to an embodiment of this presentation, the guiding lumen 206 can also have a circular cross-section, thus making the "zipp" catheter 202 particularly suitable for receiving in guiding lumen 206 a steerable micro-endoscope 10 as illustrated in FIGS. 1-8, having an elongated member 12 with a circular cross-section.

The "zipp" catheter assembly as disclosed in this presentation is relatively inexpensive and therefore designed to be disposable such that during a particular procedure, more than one "zipp" catheter assembly may be used in succession, disposing of each "zipp" catheter assembly after use, so that more than one therapy can be delivered as may be desired for that procedure, keeping the micro-endoscope elongated member 112 in the position of interest.

The length of "zipp" catheter assembly 200 can be manufactured to match length of endoscope elongated member 112 selected for use.

The largest working channel/lumen 204 can be in the center (and it can be coupled to a connector having a one-way valve) and can be used for delivery of therapy such as liquid medicine (such as antibiotic), gel, bonding agents, and more as determined by the surgeon/physician. This presentation opens endless possibilities of configurations of the catheter assemblies and therapies that the physician may want to use.

The two available smaller working channels 204 shown for example in FIG. 19 can be used for suction (on one channel) and delivery of saline (on the other channel).

According to an embodiment, the "zipp" catheter assembly is dependent on flat micro-endoscope 112 as a system and is designed to fit the flat scope imaging system.

According to an embodiment of this disclosure, the "zipp" catheter can be configured to support additional imaging modalities including, OCT, ultra-sound, spectroscopy, and therapy modalities including laser ablation.

An embodiment of this presentation relates to: a multi-lumen micro catheter that is designed to follow a steerable micro endoscope having a cross-section profile matching one of the lumens in the catheter, where the micro-endoscope provides guiding image to position the scope in the location of interest without the use of contrast, or other external means, wherein the catheter is a low cost, disposable catheter capable of following the scope to the destination set by the scope and delivering any assortments of therapy, including irrigation, suction, tissue excision, laser ablation or electro surgery.

An embodiment of this presentation, provides micro-invasive imaging and diagnosing scope, capable of navigation to any destination in the patient's body to be used subsequently as a guide for inexpensive, disposable, multi-lumen catheter with one lumen preferably matching exactly the shape of the guiding scope and the rest of the lumens providing means to deliver any therapy called for in the procedure.

According to embodiments of this presentation, the use of the Steerable Micro-Endoscope provides in vivo access to diagnosis by adopting advanced methods like OCT, ultra-sound and hyperspectral imaging, that doctor can act on directly without taking the scope out of the patient. Using the scope as a guide, doctor can introduce the disposable zip catheter configured to serve the need of the therapy to address this particular procedure. Combining method for diagnosis with independent method for therapy into one micro-invasive procedure allows to dramatically lower the cost and simplify micro-invasiveness of the procedure. After procedure, the scope can be disinfected and made ready for the next use (or disposed of in case of a disposable scope) and the catheter can be disposed of with minimal cost.

According to embodiments of this presentation, depending on the nature of diagnosis, different "zipp" catheters can be employed. Almost infinite range of sizes and combinations of insufflation, suction, electro surgery, laser ablation, and biopsy can be configured in the "zipp" catheter.

According to embodiments of this presentation, the micro-endoscope is constructed deliberately to minimize the size of the scope in one direction and result in none-symmetrical shape so any rotational movement of the scope would directly translate to rotation of the "zipp" catheter. As long as the catheter has "zipp" lumen matching the shape of the scope, the rest of the lumens can vary in numbers, function, size, or shape.

According to embodiments of this presentation, diagnosis starts with the steerable micro-invasive procedure helped by local anesthetic, using a steerable micro-endoscope introduced with an introducer or via natural orifice. After reaching destination diagnosis is possible with a use of imaging provided by the scope. At this point doctor has an option to employ any of the "zipp" Catheters configured to deliver therapy of choice. The distal end of the "zipp" Catheter is placed in line with the insertion key/coupler found on the proximal end of the scope. With the branch of the insertion key placed inside the "zipp" or guiding lumen one can couple the "zipp" catheter around the scope by pushing the "zipp" catheter on to the scope and subsequently into the body of the patient. The correct extension will be verified by the imaging system showing the distal edge of the "zipp" catheter on image display. At this point the user/doctor has complete access and control over the area of interest. Any manipulation or movement of the scope, like steering or rotation, is directly coupled with the "zipp" catheter. At this point, using working channels of the "zipp" catheter, the doctor can perform any procedure while observing in vivo. If the situation calls for it, the doctor can change the "zipp" catheter in the middle of the therapy without moving the scope (the scope can comprise locks allowing to lock the rotation of its elongated member and the bending of its distal end) and introduce different configuration of the "zipp" catheter from the wide variety of choices available in the system. After finishing the procedure, one can discard the inexpensive "zipp" catheter(s) and sterilize the micro-endoscope so it is ready for the next use (or dispose of the micro endoscope if it is disposable).

The Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A steerable micro-endoscope comprising a cylindrical elongated member having a distal end and a proximal end, the elongated member comprising at least a first lumen, a tensioning wire running in the first lumen, a distal end of the tensioning wire being attached at the distal end of the elongated member and a proximal end of the tensioning wire exiting the first lumen at the proximal end of the elongated member;

the elongated member having a proximal portion extending from the proximal end toward the distal end of the elongated member and a distal portion extending from the distal end to the proximal portion of the elongated member, the proximal portion having a first durometer and the distal portion having a second durometer, lower than the first durometer; the first lumen being arranged such that the distal portion of the elongated body bends when the proximal end of the tensioning wire is pulled;

wherein the elongated member comprises a second lumen; an electrode wire being arranged in the second lumen such that the distal end of the electrode wire does not protrude from the distal portion of the elongated member when the elongated member is not bent, and such that the distal end of the electrode wire protrudes from the distal portion of the elongated member when the elongated member is bent by more than a predetermined angle.

2. The steerable micro-device of claim 1, wherein the elongated member is held in an outer tube comprising:

a torque tube having an axial lumen with an inner diameter equal to, or slightly larger than, the outer diameter of the elongated member; and a torque mesh-sheath wound around the torque tube.

3. The steerable micro-device of claim 2, wherein the torque mesh-sheath is covered by an outer sheath.

4. The steerable micro-device of claim 3, wherein the elongated member comprises a third lumen; an optical fiber arranged in the third lumen having a proximal end capable of receiving light from a source of light and a distal end capable of emitting light received at the proximal end from the distal end.

5. The steerable micro-device of claim 4, wherein the proximal end of the optical fiber is coupled with a connector for interfacing with a source of light.

6. The steerable micro-device of claim 4, wherein the elongated member comprises a fourth lumen and the distal end of the elongated member comprises a camera, at least a first wire of the camera running through the fourth lumen.

7. The steerable micro-device of claim 6, wherein a plurality of shielded wires of the camera run through the fourth lumen.

8. The steerable micro-device of claim 7, wherein the proximal ends of the wires of the camera are coupled to a connector for interfacing with an imaging device.

9. The steerable micro-device of claim 6, wherein the camera is aligned along the axis of the elongated member.

10. The steerable micro-device of claim 6, wherein the distal end of the distal portion comprises a head made in a material different from the material of the elongated member, a distal portion of the head having the same cross section surface as the elongated member with the torque braid and the outer sheath.

11. The steerable micro-device of claim 10, wherein a proximal portion of the head is provided for being inserted in a corresponding cavity formed at the distal end of the elongated member.

12. The steerable micro-device of claim 10, wherein the distal end of the tensioning wire is attached to the head.

13. The steerable micro-device of claim 10, wherein the camera is attached in the head.

14. The steerable micro-device of claim 10, wherein the head comprises at least one lumen through which passes the distal end of the electrode wire.

15. The steerable micro-device of claim 14, wherein the head is made out of an insulator.

16. The steerable micro-device of claim 14, wherein the head is made out of metal and the lumen for the electrode wire is lined with an insulator.

17. The steerable micro-device of claim 10, wherein the head comprises at least one lumen through which passes the distal end of the optical fiber.

18. The steerable micro-device of claim 6, wherein at least the radial sides of the camera are enclosed in a Faraday shielding box.

19. The steerable micro-device of claim 2, wherein the electrode wire is coated with an insulator provided for facilitating the sliding of the electrode wire in the second lumen.

20. The steerable micro-device of claim 1, wherein the first durometer is chosen such that the proximal portion is flexible, and the second durometer is chosen such that when the tensioning wire is pulled, the distal portion bends.

21. The steerable micro-device of claim 20, wherein the second durometer is chosen such that when the tensioning wire is relaxed after having been pulled, the distal portion returns to an unbent shape.

22. The steerable micro-device of claim 1, wherein the elongated member has a circular cross-section with a diameter lower than 2 millimeter.

23. The steerable micro-device of claim 1, wherein the elongated member has a non circular cross-section with a maximum dimension lower than 2 millimeter.

24. The steerable micro-device of claim 1, wherein the tensioning wire has a diameter of 0.15 millimeter or less.

25. The steerable micro-device of claim 1, wherein the proximal end of the elongated member is attached to a base that is rotatable with respect to a proximal housing around an axis of the proximal end of the elongated member.

26. The steerable micro-device of claim 18, wherein the electrode wire has a diameter of 0.2 mm or less and is located between 0.5 mm and 0.05 mm from said shielded camera.

27. The steerable micro-device of claim 26, wherein the shielded camera has a cross section of 0.5 mm×0.5 mm or less.

28. The steerable micro-device of claim 26, wherein at least all the distal end of the electrode wire is coated with an insulator layer of 20 micrometer or less.

* * * * *